US010283903B2

(12) United States Patent
Yamanaka

(10) Patent No.: US 10,283,903 B2
(45) Date of Patent: May 7, 2019

(54) RECEPTACLE CONNECTOR AND CONNECTOR

(71) Applicant: HOSIDEN CORPORATION, Osaka (JP)

(72) Inventor: Satoshi Yamanaka, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 0 days.

(21) Appl. No.: 15/848,739

(22) Filed: Dec. 20, 2017

(65) Prior Publication Data

US 2018/0183177 A1 Jun. 28, 2018

(30) Foreign Application Priority Data

Dec. 27, 2016 (JP) ................................ 2016-254315

(51) Int. Cl.
*H02B 1/01* (2006.01)
*H01R 13/52* (2006.01)
(Continued)

(52) U.S. Cl.
CPC ....... *H01R 13/5221* (2013.01); *H01R 13/502* (2013.01); *H01R 13/506* (2013.01);
(Continued)

(58) Field of Classification Search
CPC .............. H01R 13/5202; H01R 13/521; H01R 13/5221; H01R 13/502; H01R 13/6581;
(Continued)

(56) References Cited

U.S. PATENT DOCUMENTS 5,490,412 A * 2/1996 Duce .................. G01N 27/4062 73/114.73
6,280,237 B1 * 8/2001 Saka .................. H01R 13/4361 439/271

(Continued)

FOREIGN PATENT DOCUMENTS

EP 2161791 A2 3/2010
JP 2016-201193 A 12/2016

OTHER PUBLICATIONS

European Search Report dated May 16, 2018.
European Search Report dated Sep. 28, 2018.

*Primary Examiner* — Edwin A. Leon
*Assistant Examiner* — Milagros Jeancharles
(74) *Attorney, Agent, or Firm* — Dilworth & Barrese, LLP.; Michael J. Musella, Esq.

(57) ABSTRACT

Provided are a receptacle connector and a connector with simple structures, which include an added function such as a waterproofing function. The receptacle connector includes: a signal terminal that transmits signals between a plug connector side and an electronic substrate side in an extension direction; an insulating holder that has a circular column shape extending in the extension direction and that holds the signal terminal by being penetrated thereby; a conductive first shell in the form of a tube that covers the outer circumference in the radial direction, which is orthogonal to the extension direction of the holder; a non-conductive connector case having a cylindrical space that contains the first shell and extends in the extension direction; an inner seal member that seals the inner portion of the first shell in the extension direction; and an outer seal member that seals the inner portion of the cylindrical space in the extension direction.

18 Claims, 6 Drawing Sheets

(51) Int. Cl.

| | |
|---|---|
| ***H01R 13/648*** | (2006.01) |
| ***H01R 13/642*** | (2006.01) |
| ***H01R 13/639*** | (2006.01) |
| ***H01R 13/502*** | (2006.01) |
| ***H01R 13/6581*** | (2011.01) |
| ***H01R 13/506*** | (2006.01) |

(52) U.S. Cl.

CPC ....... *H01R 13/521* (2013.01); *H01R 13/5202* (2013.01); *H01R 13/639* (2013.01); *H01R 13/642* (2013.01); *H01R 13/648* (2013.01); *H01R 13/6581* (2013.01)

(58) Field of Classification Search

CPC ... H01R 13/639; H01R 13/642; H01R 13/648

USPC .................................................. 439/552, 271

See application file for complete search history.

(56) References Cited

U.S. PATENT DOCUMENTS

| | | | | |
|---|---|---|---|---|
| 8,356,950 | B2 * | 1/2013 | Sato ......................... | G03B 3/10 396/529 |
| 10,074,924 | B2 * | 9/2018 | Yamanaka ......... | H01R 13/4367 |
| 2002/0101041 | A1 * | 8/2002 | Kameyama .......... | H01R 13/521 277/628 |
| 2002/0134565 | A1 | 9/2002 | Hashizawa et al. | |
| 2006/0033218 | A1 * | 2/2006 | Hafner ................. | H01R 13/622 257/778 |
| 2009/0275226 | A1 * | 11/2009 | Chen .................. | H01R 13/5202 439/271 |
| 2011/0286787 | A1 | 11/2011 | Shibata | |
| 2012/0270444 | A1 | 10/2012 | Kawamura | |
| 2015/0207263 | A1 * | 7/2015 | Fabre ................... | H01R 13/506 439/271 |
| 2017/0324188 | A1 | 11/2017 | Guo et al. | |
| 2018/0006407 | A1 | 1/2018 | Sasaki | |

* cited by examiner

RECEPTACLE CONNECTOR AND CONNECTOR

CROSS-REFERENCE TO RELATED APPLICATIONS

This application is based on and claims priority under 35 U.S.C. Section 119 to Japanese Patent Application No. 2016-254315 filed on Dec. 27, 2016, the entire content of which is incorporated herein by reference.

BACKGROUND OF THE INVENTION

1. Technical Field

The present disclosure relates to a receptacle connector and a connector in which the receptacle connector is used.

2. Related Art

Accompanying an increase in the processing speed and communication speed of recent electronic devices, receptacle connectors for high-speed transmission that shield signal terminals with a conductive material and have structures that are resistant to noise have been used to connect internal wiring and electronic devices. As disclosed in JP 2016-201193A, this kind of receptacle connector is used widely in particular for connecting internal wiring of a vehicle-mounted device such as a vehicle-mounted camera, a car navigation system, car audio, and other vehicle-mounted devices, and electronic devices.

This kind of receptacle connector has a signal terminal with one side connected to an electronic substrate of an electronic device, and is used as an electronic substrate unit (e.g., a vehicle-mounted camera unit obtained by attaching a receptacle connector to a vehicle-mounted camera module serving as the electronic substrate) in some cases.

Also, this kind of receptacle connector is sometimes used together with a plug connector connected to a connection portion on a side of the receptacle connector corresponding to the plug connector (hereinafter referred to as "plug connector side"), which is the side opposite to a side corresponding to the electronic substrate (hereinafter referred to as "electronic substrate side"), to form a pair of connectors.

In the case of using the above-described receptacle connector to connect the internal wiring of a vehicle-mounted device and electronic devices in this manner, addition of added functions corresponding to the vehicle-mounted application is further required of the receptacle connector.

Examples of added functions include a waterproofing function, ease of attaching an electronic substrate including an electronic circuit (hereinafter referred to as "mountability"), an ability of shielding the electronic circuit from noise, ease of assembly, and safety during use.

SUMMARY

If the above-described added functions are added to the receptacle connector, the structure of the receptacle connector becomes complicated in some cases, which is problematic.

An embodiment of the present invention has been made in view of the foregoing circumstance and it is an object thereof to provide a receptacle connector and a connector with simple structures, which include an added function such as a waterproofing function.

A characteristic configuration of a receptacle connector according to an embodiment of the present invention for achieving the above-described object lies in including:

a signal terminal that can fit together with a plug connector in an extension direction and that is configured to transmit a signal between a plug connector side and an electronic substrate side;

an holder made of insulator that has a circular column shape extending in the extension direction and that is configured to hold the signal terminal by being penetrated thereby in the extension direction;

a conductive first shell in the form of a tube that covers an outer circumference in a radial direction of the holder;

a non-conductive connector case including a cylindrical space that contains the first shell and extends in the extension direction; and an inner seal member that seals an inner portion of the first shell and an outer seal member that seals an inner portion of the cylindrical space, wherein the inner seal member is an elastic member that has a circular column shape extending in the extension direction, the inner seal member includes an insertion hole into which the signal terminal is press-fit, and the inner seal member seals the inner portion of the first shell in the extension direction in a state in which an outer circumferential portion in the radial direction of the inner seal member is pressed into contact with an inner circumferential surface in the radial direction of the first shell, and the outer seal member is a circular ring-shaped elastic member and seals the inner portion of the cylindrical space in the extension direction in a state in which an outer circumferential portion in the radial direction is pressed into contact with an inner circumferential surface of the connector case forming the cylindrical space and an inner circumferential portion in the radial direction is pressed into contact with an outer circumferential surface of the first shell.

According to the above-described configuration, the holder is in a state of holding the signal terminal at the approximate center portion in the extension direction of the signal terminal (i.e., a state in which both end portions of the signal terminal are exposed). Also, the holder is covered by the first shell due to being inserted into the tube of the first shell or the like, for example, while holding the signal terminal.

For this reason, when held by the holder, the signal terminal overlaps in a view in the radial direction of the signal terminal with the portion of the tube of the conductive first shell, and the signal terminal is shielded from electrical noise (electromagnetic waves) from the radial direction at the overlapping portion. In this state, the signal terminal and the holder are contained in the connector case via the first shell and function as the receptacle connector.

The receptacle connector is further sealed in the extension direction by an inner seal member and an outer seal member, and are made waterproof due to water being prevented from entering the electronic substrate side from the plug connector side.

Specifically, the signal terminal is press-fit into the insertion hole in the elastic inner seal member, and therefore the inner surface of the insertion hole is pressed into contact with the signal terminal and the gap between the signal terminal and the inner seal member is sealed. Also, since the outer circumferential portion of the inner seal member is pressed into contact with the inner circumferential surface of the first shell, the inner seal member seals the gap between the first shell and the inner seal member. That is, the inner side of the tube of the first shell is sealed by the signal terminal and the inner seal member, and thus water is prevented from entering the electronic substrate side from the plug connector side.

Also, the outer circumferential portion of the outer seal member is pressed into contact with the inner circumferential portion of the connector case so as to seal the gap between the outer seal member and the connector case. Also, the inner circumferential portion of the outer seal member is pressed into contact with the outer circumferential surface of the first shell so as to seal the gap between the first shell and the outer seal member. In other words, the gap between the inner circumferential surface of the connector case and the first shell is sealed by the outer seal member, whereby water is prevented from entering the electronic substrate side from the plug connector side.

Thus, it is possible to provide a receptacle connector including an added function, which is a function of preventing water from entering the electronic substrate side from the plug connector side, with a simple structure obtained by merely adding an inner seal member and an outer seal member.

A further characteristic configuration of a receptacle connector according to an embodiment of the present invention lies in that the connector case includes a first engagement hook that protrudes from the inner circumferential surface of the connector case forming the cylindrical space to an inner side in the radial direction and has an elastic force along the radial direction, on the outer circumferential surface of the first shell, the first shell includes a first engagement recessed portion with which the first engagement hook engages, and due to the engagement between the first engagement hook and the first engagement recessed portion, the first shell is restricted from moving with respect to the connector case in the extension direction and is locked to the connector case.

According to the above-described configuration, the first shell and the connector case can be locked with a simple structure in which the hook portion of the first engaging hook in the cylindrical space and the recessed portion of the first engagement recessed portion of the first shell are engaged, and movement of the first shell with respect to the connector case in the extension direction can be restricted in the state in which the first shell is arranged contained in the cylindrical space of the connector case.

A further characteristic configuration of a receptacle connector according to an embodiment of the present invention lies in including a spacer including a surface portion, wherein the surface portion includes a support portion that supports the signal terminal by being penetrated thereby, and a second engagement hook having an elastic force in the radial direction, the second engagement hook protrudes from the surface portion to the plug connector side in the extension direction and is arranged on an outer side in the radial direction of the support portion, on the outer circumferential surface of the first shell, the first shell includes a second engagement recessed portion with which the second engagement hook engages, and the spacer is arranged on the signal terminal in a state in which movement in the extension direction with respect to the connector case is restricted due to the engagement between the second engagement hook and the second engagement recessed portion.

With the above-described configuration, an arrangement in which the signal terminal penetrates through the surface portion of the spacer, or in other words, an arrangement in which the surface portion of the spacer intersects with, or is orthogonal to, the extension direction of the signal terminal is achieved. For this reason, an electronic substrate such as a vehicle-mounted camera module can be mounted on the surface portion of the spacer. Also, the support portion located at the surface portion of the spacer supports the signal terminal due to being penetrated thereby, and therefore the position of the signal terminal with respect to the electronic substrate can be accurately restricted.

Also, movement of the spacer in the extension direction with respect to the first shell can be restricted with a simple structure in which the hook portion of the second engagement hook and the recessed portion of the second engagement recessed portion are engaged, and it is possible to maintain the state in which the spacer is arranged on the signal terminal.

Note that movement of the first shell in the extension direction with respect to the connector case is restricted, and therefore movement of the spacer in the extension direction with respect to the connector case via the first shell is restricted.

A further characteristic configuration of a receptacle connector according to an embodiment of the present invention lies in that a surface on the electronic substrate side of the inner seal member is locked by the support portion and is installed at the signal terminal.

With the above-described embodiment, the surface on the electronic substrate side of the inner seal member is locked by the support portion, and thus the inner seal member can be prevented from moving to the electronic substrate side. As a result, a case in which the inner seal member falls off from the electronic substrate side can be avoided with a simple structure.

Note that the surface on the electronic substrate side of the inner seal member can be locked by the surface on the plug connector side of the support portion, for example.

A further characteristic configuration of a receptacle connector according to an embodiment of the present invention lies in that a surface on the plug connector side of the inner seal member is locked by the surface on the electronic substrate side of the holder.

With the above-described configuration, the surface on the plug connector side of the inner seal member is locked by the surface on the electronic substrate side of the holder, and thus it is possible to prevent the inner seal member from moving to the plug connector side. As a result, a case in which the inner seal member falls off from the plug connector side can be avoided with a simple structure.

A further characteristic configuration of a receptacle connector according to an embodiment of the present invention lies in that the surface on the plug connector side of the outer seal member is locked by the connector case.

With the above-described configuration, the surface on the plug connector side of the outer seal member is locked by the connector case, and thus it is possible to prevent a case in which the outer seal member moves to the plug connector side. As a result, a case in which the outer seal member falls off from the plug connector side can be avoided with a simple structure.

A further characteristic configuration of a receptacle connector according to an embodiment of the present invention lies in including a conductive second shell having a bottomed tube shape with a bottom portion and a side wall portion, wherein the side wall portion is bent from the periphery of the bottom portion and extends to the electronic substrate side in the extension direction, the bottom portion includes an opening portion through which the first shell penetrates, the opening portion includes a protrusion portion that is bent from an edge portion of the opening portion and extends to the electronic substrate side in the extension direction, and the second shell is arranged on the first shell in a state in which the outer circumferential surface of the first shell and an inner circumferential surface in the radial direction of the protrusion portion are in surface contact.

With the above-described configuration, an arrangement in which the bottom portion of the second shell penetrates through the first shell, or in other words, an arrangement in which the bottom portion of the second shell intersects with, or is orthogonal to, the extension direction of the signal terminal or the like is achieved. For this reason, the conductive second shell, which is in the arrangement, can cover the electronic substrate side (enclose from the plug connector side to the electronic substrate side) with the side wall portion, the protrusion portion, and the bottom portion, which protrude to the electronic substrate side, and the electronic substrate side can be shielded and protected from electrical noise. For example, if an electronic substrate such as a vehicle-mounted camera module is connected to the electronic substrate side, the electronic substrate and the electronic circuit of the camera module can be protected from electrical noise.

Also, the inner circumferential surface of the protrusion portion is arranged on the first shell in surface contact therewith, and therefore the first shell and the second shell are electrically connected and share the ground. For this reason, the first shell and the second shell have approximately the same potential. Also, the gap between the first shell and the second shell can be reduced. Accordingly, when the second shell is used, it is possible to more reliably shield and protect the electronic substrate side from electrical noise.

In other words, it is possible to provide a receptacle connector that includes an added function of shielding and protecting the electronic substrate side from electrical noise with a simple configuration obtained by merely adding a conductive second shell with a bottomed tube shape.

A further characteristic configuration of a receptacle connector according to an embodiment of the present invention lies in that the spacer is arranged on the electronic substrate side with respect to the second shell, and the second shell is arranged on the first shell and is locked by the spacer, so as to be restricted from moving in the extension direction with respect to the first shell.

With the above-described configuration, the second shell is locked by the spacer from the electronic substrate side, and thus it is possible to prevent the second shell from moving to the electronic substrate side. As a result, a case in which the second shell falls off from the electronic substrate side can be avoided with a simple configuration.

A further characteristic configuration of a receptacle connector according to an embodiment of the present invention lies in that the outer seal member is arranged on the first shell with its surface on the electronic substrate side locked by the second shell.

With the above-described configuration, the surface on the electronic substrate side of the outer seal member is locked by the second shell from the electronic substrate side, and thus it is possible to prevent the outer seal member from moving to the electronic substrate side. As a result, a case in which the outer seal member falls off from the electronic substrate side can be avoided with a simple structure.

A characteristic configuration of a receptacle connector according to an embodiment of the present invention for achieving the above-described object lies in including the receptacle connector described above; and the plug connector that is connected to the connector case by being inserted therein from the plug connector side of the receptacle connector, wherein the plug connector includes a connection tube portion that overlaps in a view in a radial direction with the first shell when inserted into the connector case, and at a position at which the first shell and the connection tube portion overlap, the first shell includes a socket-side seal member that seals a gap between the first shell and the connection tube portion.

With the above-described configuration, the gap between the first shell and the connection tube portion of the plug module is sealed by the socket-side seal member, and thus water is prevented from entering the inner side of the first shell from the outer side of the connection tube portion.

Accordingly, it is possible to provide a connector including an added function, which is a function of preventing water from entering the electronic substrate side from the plug connector side, with a simple configuration obtained by merely adding an inner seal member, an outer seal member, and a socket-side seal member.

DESCRIPTION OF EMBODIMENTS

A receptacle connector and a connector according to an embodiment of the present invention will be described with reference to FIGS. 1 to 9.

Figure 1:
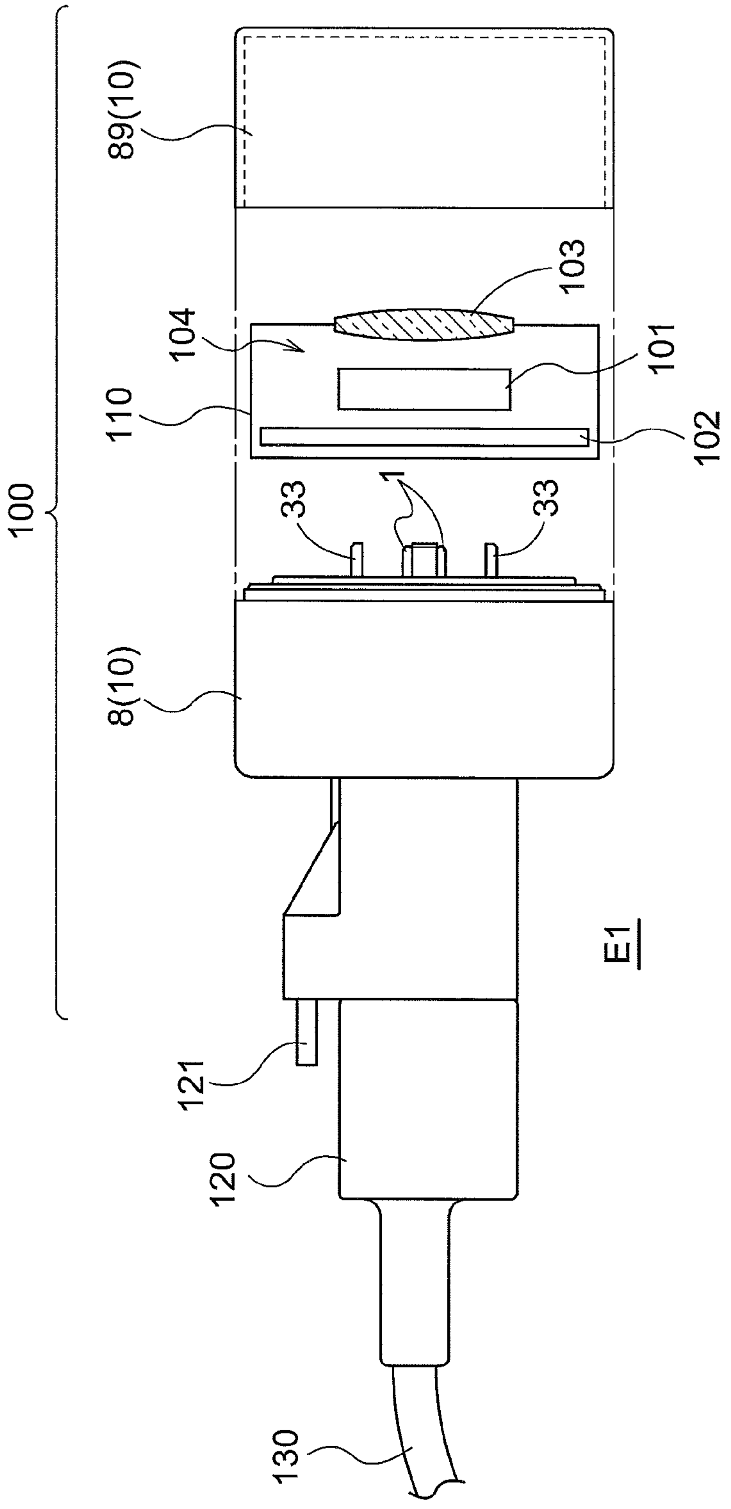
FIG. 1 is a schematic diagram of a camera unit constituted by a receptacle connector, a connector, and a camera module.

As shown schematically in FIG. 1, the present embodiment describes, as an example, a receptacle connector 10 that is to be attached to a camera module 110 serving as an example of an electronic substrate, and that is to be used in a camera unit 100 (e.g., a vehicle-mounted camera to be installed in a car) that is to be mounted in a vehicle (not shown).

First, a schematic configuration of a mode in which the receptacle connector 10 is used will be described.

Schematic Configuration of Usage Mode of Receptacle Connector

The receptacle connector 10 according to the present invention is normally used in a connector 20 (see FIG. 7), the receptacle connector 10 being paired with a plug connector 120 that is connected by being inserted from a plug connector side L1 (see FIG. 2) of the receptacle connector 10.

The connector 20 is used to electrically connect a cable 130 connected to the plug connector 120 and the camera module 110.

Note that the cable 130 is a signal line or a power supply line that is obtained by covering an inner conductor (not shown) with an insulator (not shown), and that transmits a signal, is connected to ground (earth), or supplies power. The cable 130 includes an outer conductor (not shown) serving as an electrical protection member (a so-called shield) that covers the inner conductor together with the insulator and protects the inner conductor from electrical noise from an outer space E1.

Figure 7:
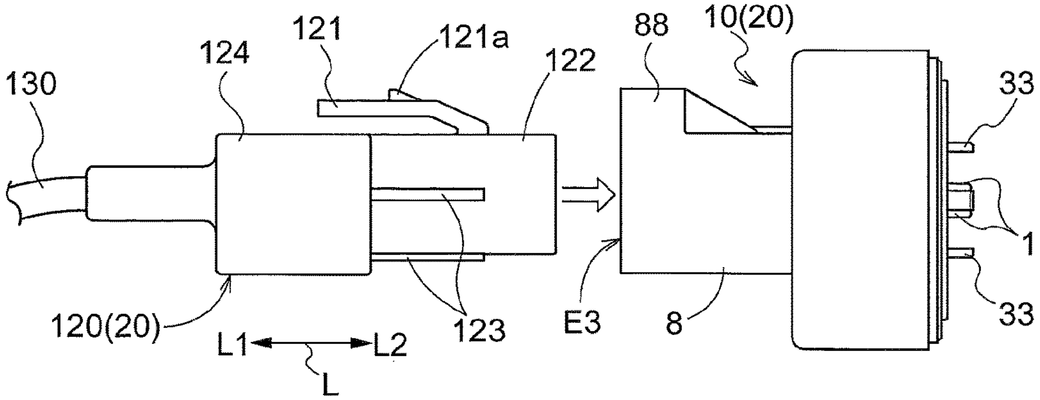
FIG. 7 is a diagram showing a schematic configuration of a connector.

As shown in FIG. 7, specifically, for example, the connector 20 outputs signals from the cable 130 to the camera module 110 (see FIG. 1) and outputs signals from the camera module 110 to the cable 130. Furthermore, the power for driving that is supplied from the cable 130 is supplied to the camera module 110.

Note that examples of signals transmitted by the cable 130 include signals for controlling the camera module 110 and image signals including image information received from the camera module 110.

Schematic Configuration of Receptacle Connector

A schematic configuration of the receptacle connector 10 will be described hereinafter.

Figure 2:
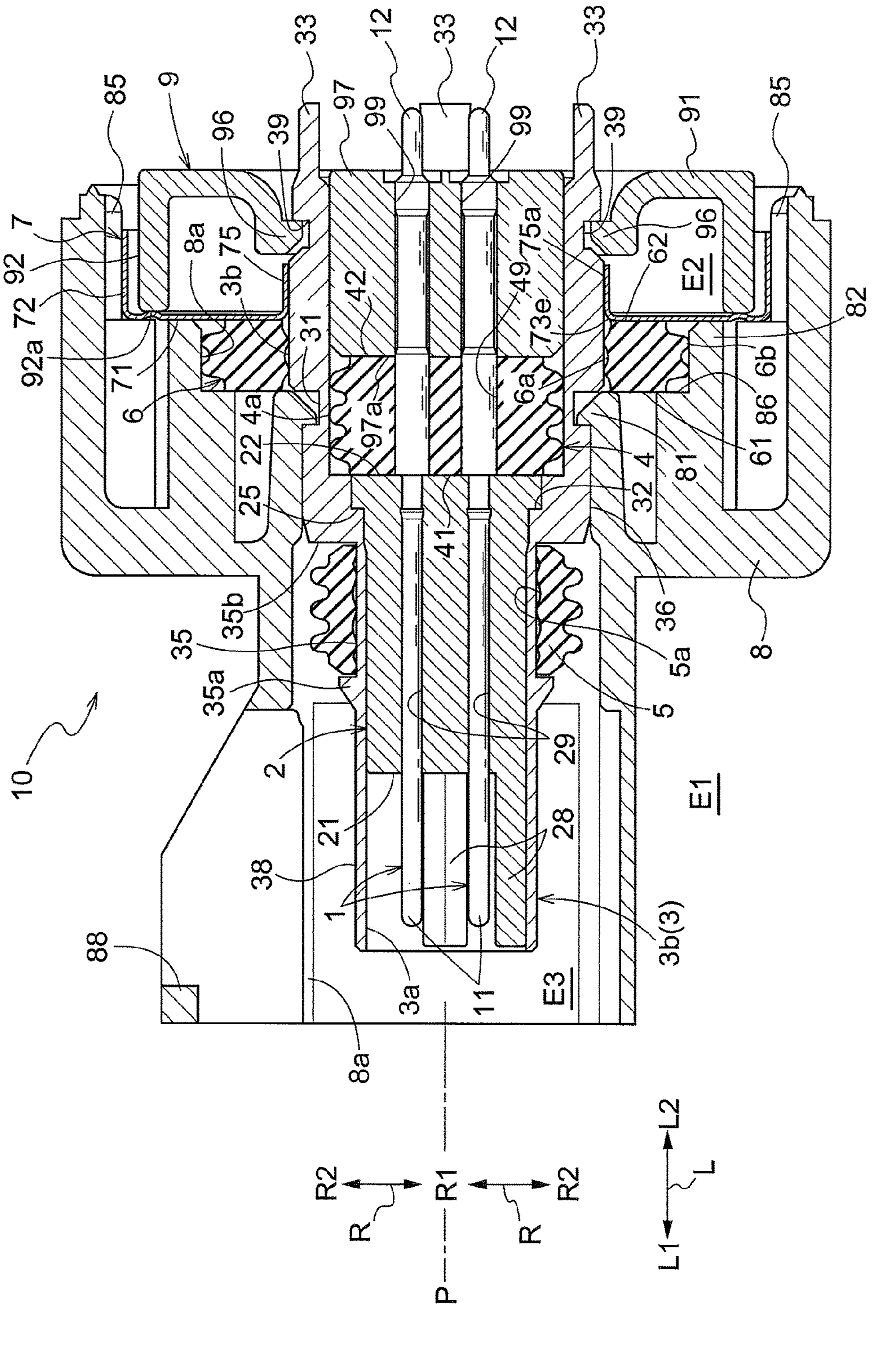
FIG. 2 is a cross-sectional view of a receptacle connector.
Figure 4:
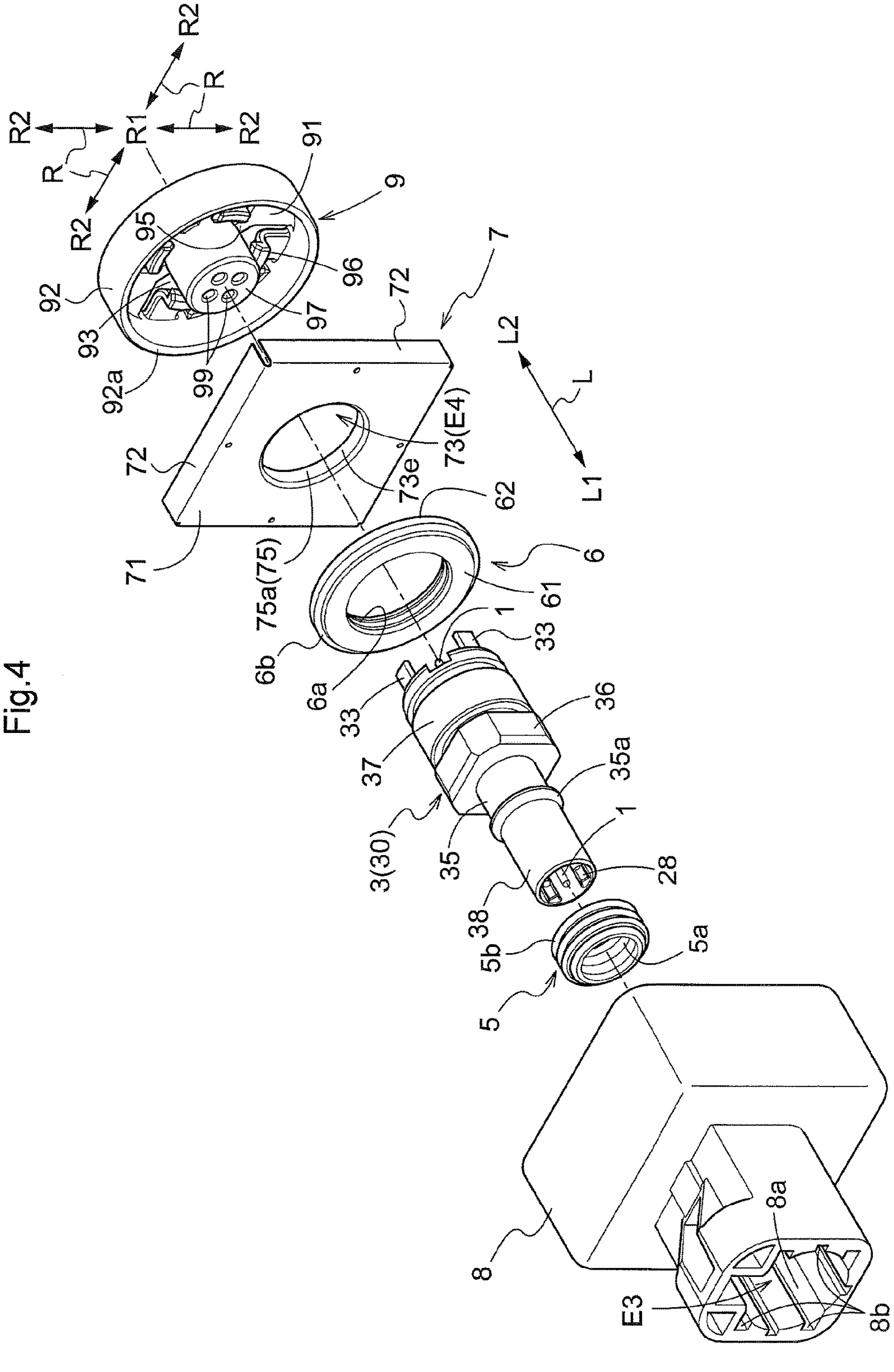
FIG. 4 is an exploded perspective view of a receptacle connector.
Figure 5:
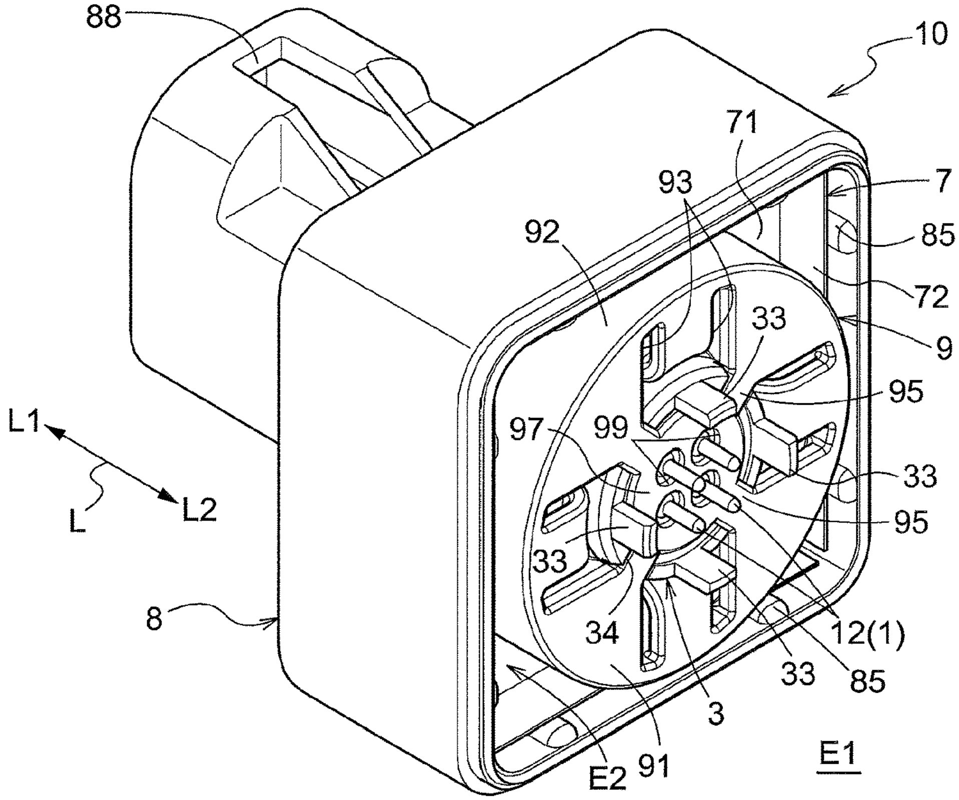
FIG. 5 is a perspective view of a receptacle connector from an electronic substrate side.

As shown in FIGS. 2, 4, and 5, the receptacle connector 10 includes: four linear signal terminals 1 that can fit together with the plug connector 120 (see FIG. 7) in an extension direction L and transmit signals between the plug connector side L1 and an electronic substrate side L2; an insulating holder 2 that has a circular column shape extending in the extension direction L, and that holds the signal terminals 1 by being penetrated by them in the extension direction L; a conductive first shell 3 having a tube shape that covers the outer circumference of the holder 2 in a radial direction R that is orthogonal to the extension direction L; and a non-conductive connector case 8 that includes a cylindrical space E3 that extends in the extension direction L and contains the first shell 3.

Note that FIG. 2 shows a cross-section taken along the extension direction L of the receptacle connector 10.

The receptacle connector 10 further includes: an inner seal member 4 that seals the interior of the first shell 3 in the extension direction L; and an outer seal member 6 that seals the interior of the cylindrical space E3 in the extension direction L, and thus water is prevented from entering the electronic substrate side L2 from the plug connector side L1 (hereinafter referred to as "waterproofing"). By thus including the waterproofing function, it is possible to prevent accidents such as short-circuiting, for example, and thus high safety can be provided.

Also, the receptacle connector 10 includes a second shell 7, which is an electrical protection member that covers the electronic substrate side L2 of the receptacle connector 10 so as to shield and protect it from electrical noise (electromagnetic waves) oriented from mainly the plug connector side L1 to the electronic substrate side L2 of the outer space E1, and a spacer 9 for mounting the camera module 110.

Hereinafter, the parts of the receptacle connector 10 will be described in detail.

Figure 6:
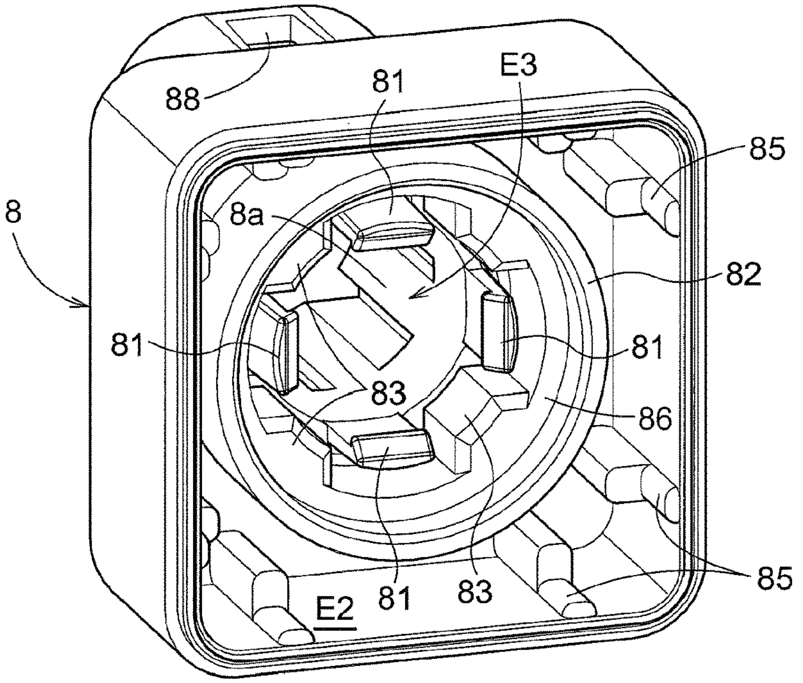
FIG. 6 is a perspective view of a connector case from an electronic substrate side.

As shown in FIGS. 2, 5, and 6, the connector case 8 includes a cylindrical space E3 partitioned by an inner circumferential surface 8*a*, and a space E2.

The connector case 8 is a container for the receptacle connector 10 that contains a terminal module 30 composed of the first shell 3 in the cylindrical space E3, and into which the plug connector 120 is inserted. Note that "terminal module 30" refers to a module obtained by assembling the holder 2 holding the signal terminal 1 and the inner seal member 4 in the first shell 3.

Also, the second shell 7 and the spacer 9 are contained in the space E2 of the connector case 8.

The connector case 8 is formed of an insulating (non-conductive) material such as resin. The purpose of this is to insulate the signal terminal 1, the first shell 3, and the second shell 7 from the exterior of the receptacle connector 10 because the signal terminal 1, the first shell 3, and the second shell 7 are conductive.

If the connector case 8 is made of resin, the connector case 8 can be formed of nylon, polypropylene, polyphenylene sulfide resin, vinyl chloride resin, or the like, and the present embodiment indicates a case of being formed of nylon as one embodiment.

The connector case 8 includes first engagement hooks 81 and an outer seal contact surface 86 on the inner circumferential surface 8*a* of the connector case 8 that forms the cylindrical space E3 (see FIG. 6).

The first engagement hooks 81 are multiple (in the present embodiment, four) hook-shaped protrusions that protrude to an inner side R1 in the radial direction R from the inner circumferential surface 8*a* and have elastic forces along the radial direction R. The first engagement hooks 81 engage with later-described first engagement recessed portions 31, which are groove-shaped recessed portions of the first shell 3 and lock the first shell 3 (terminal module 30) in the cylindrical space E3.

Jutting portions 83 that slightly protrude from the inner circumferential surface 8*a* to the inner side R1 in the radial direction R are provided between respective adjacent first engagement hooks 81 of the connector case 8 (see FIG. 6).

The outer seal contact surface 86 is a surface provided on the inner circumferential surface 8*a* of the connector case 8 and is provided as a surface that intersects the extension direction L and opposes the space E2 (a surface that faces the electronic substrate side L2). In the present embodiment, the outer seal contact surface 86 is orthogonal to the extension direction L in one mode of intersecting. The outer seal member 6 comes into contact with the outer seal contact surface 86.

The connector case 8 includes protrusions 85 and a ring-shaped extension portion 82, for example, as members that support the second shell 7 when the second shell 7 is contained in the space E2 (see FIG. 6).

The ring-shaped extension portion 82 supports a bottom portion 71 of the second shell 7 toward the electronic substrate side L2, and the protrusions 85 support the second shell 7 relatively from the sides with respect to the extension direction L.

The protrusions 85 are provided in a mode of protruding from the inner circumferential surface 8*a* to the inner side R1 in the radial direction R, for example.

The ring-shaped extension portion 82 extends in the extension direction L from the connector case 8, for example, and is provided as a ring-shaped member that extends to the electronic substrate side L2.

The space E2 is a space for containing the second shell 7 and the spacer 9. In the present embodiment, the space E2 is a space that is on the electronic substrate side L2 with respect to the leading end portion on the electronic substrate side L2 of the ring-shaped extension portion 82.

Also, in order for the receptacle connector 10 to function as the connector 20 together with the plug connector 120, the connector case 8 includes a retaining reception portion 88 that engages with a retaining pin of the plug connector 120 and prevents separation of the plug connector 120 from the connector case 8.

Also, the connector case 8 sometimes includes a main body case 89, which is a case that covers the electronic substrate side L2 of the receptacle connector 10 and contains the camera module 110 when the receptacle connector 10 is attached to the camera module 110 and is used as the camera unit 100.

Figure 3:
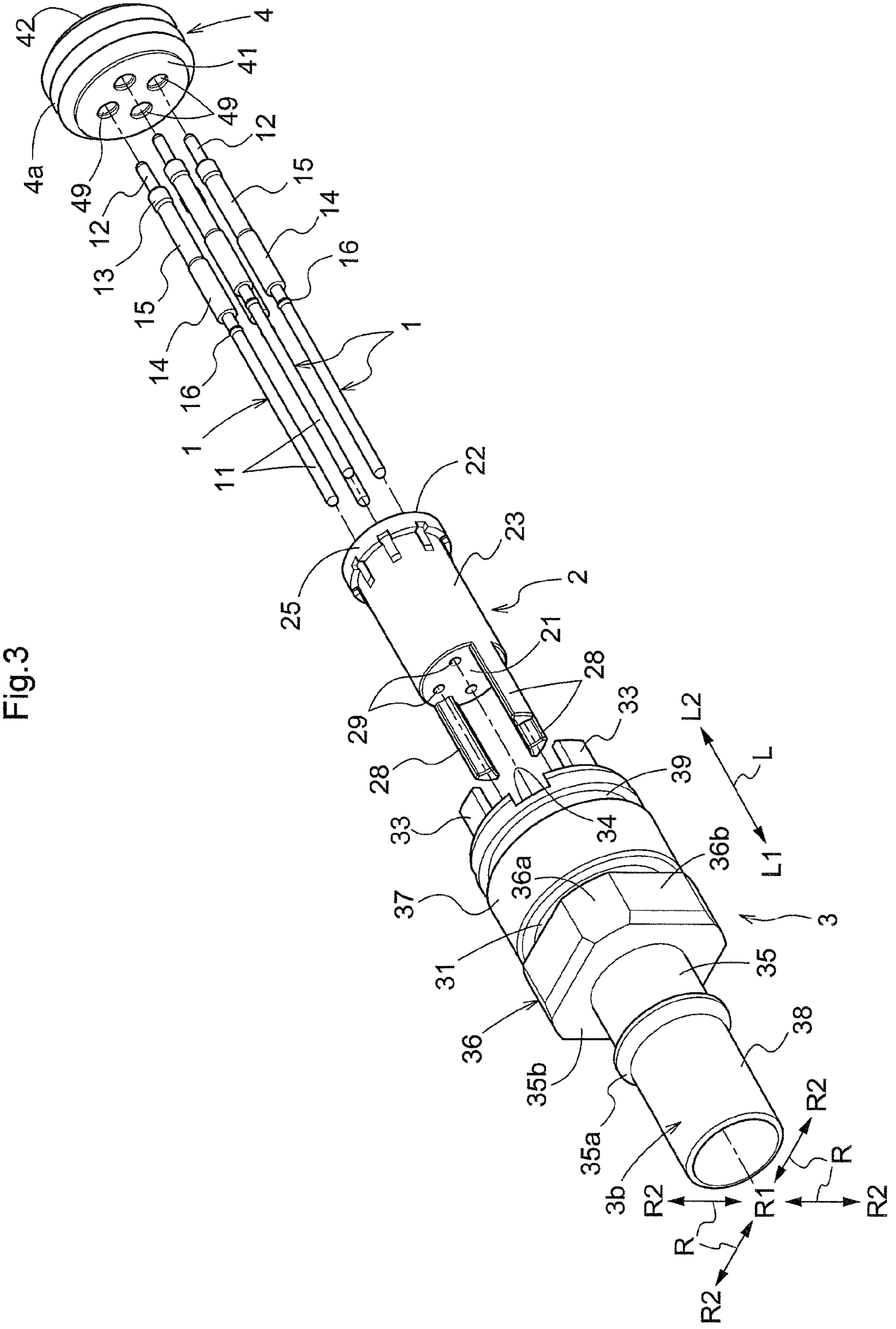
FIG. 3 is an exploded perspective view of a terminal module.

As shown in FIGS. 2, 3, and 5, the signal terminals 1 are members that transmit at least signals between the cable 130 (see FIG. 7) connected from the plug connector side L1 and the camera module 110 connected to the electronic substrate side L2.

A case is shown in which the signal terminals 1 of the present embodiment are linear conductive members the transmit signals and supply power, and are so-called contact pins. In the present embodiment, the signal terminals 1 have gold serving as a conductive coating material plated on copper serving as a metal.

In the present embodiment, the signal terminals 1 correspond to the inner conductor of the cable 130.

The diameters of the signal terminals 1 are 0.3 mm to 5 mm, for example. In the case of using the receptacle connector 10 with the camera module 110, the diameters of the signal terminals 1 are typically 0.3 mm to 1.5 mm.

The signal terminals 1 each include at least a first terminal portion 11 that is electrically connected to a connection terminal (not shown) of the plug connector 120, and a second terminal portion 12 that is electrically connected to a receptacle (not shown) of the camera module 110.

In the present embodiment, the signal terminals 1 each further include a first bulging portion 13, a second bulging portion 14, an adjustment portion 15, and a retaining protrusion 16 (see FIG. 3).

The signal terminals 1 each include a first terminal portion 11, a retaining protrusion 16, a second bulging portion 14, an adjustment portion 15, a first bulging portion 13, and a second terminal portion 12, in the stated order from the plug connector side L1 to the electronic substrate side L2.

In the present embodiment, the second terminal portion 12 is arranged in a state in which the leading end portion extends (protrudes) from the spacer 9 to the electronic substrate side L2. The purpose of this is to electrically connect to the camera module 110.

The first bulging portion 13 and the second bulging portion 14 are portions of the signal terminal 1 that are formed so as to be relatively thicker than the first terminal portion 11 and the second terminal portion 12 respectively.

The adjustment portion 15 is a portion of the signal terminal 1 that is formed so as to be relatively thicker than the first terminal portion 11 or the second terminal portion 12 and to be relatively thinner than the first bulging portion 13.

The retaining protrusion 16 is a protrusion that is provided at a position shifted toward the electronic substrate side L2 of the first terminal portion 11 (the approximate central portion of the signal terminal 1, in the vicinity of the plug connector side L1 of the second bulging portion 14).

Note that the diameter of the signal terminal 1 refers to the diameter of the first terminal portion 11 or the second terminal portion 12.

The signal terminal 1 can adjust the characteristic impedance of the receptacle connector 10 by adjusting the diameter or length of the first bulging portion 13 or the adjustment portion 15 in the extension direction L of the signal terminal 1.

As will be described later, the second bulging portion 14 is a portion that is supported by the inner seal member 4 by being inserted through the inner seal member 4.

Additional description of the adjustment of the characteristic impedance of the receptacle connector 10 by the first bulging portion 13 and the adjustment portion 15 will be given.

If the diameter of the signal terminal 1 increases, the characteristic impedance of the receptacle connector 10 decreases. Conversely, if the diameter of the signal terminal 1 decreases, the characteristic impedance of the receptacle connector 10 increases.

That is, if the diameter of the first bulging portion 13 and the adjustment portion 15, which are portions of the signal terminal 1, increase, the characteristic impedance of the receptacle connector 10 decreases. Conversely, if the diameters of the first bulging portion 13 and the adjustment portion 15 decrease, the characteristic impedance of the receptacle connector 10 increases.

Also, if the value of the total of the length of the first bulging portion 13 and the length of the adjustment portion 15 is fixed and the diameter of the first bulging portion 13 and the diameter of the adjustment portion 15 are fixed, when the length of the adjustment portion 15 is increased (when the length of the first bulging portion 13 is reduced), the characteristic impedance of the receptacle connector 10 will increase. Conversely, when the length of the adjustment portion 15 is reduced (when the length of the first bulging portion 13 is increased), the characteristic impedance of the receptacle connector 10 will decrease.

As shown in FIGS. 2 and 3, the holder 2 is an insulator that covers the signal terminals 1 and corresponds to the insulator of the cable 130. In the present embodiment, the holder 2 is formed of resin serving as an insulator. For example, nylon resin, vinyl chloride resin, polyethylene resin, or the like can be used as the resin.

Also, the holder 2 is a holding member that accurately positions and holds the signal terminals 1 due to the signal terminals 1 being inserted so as to penetrate through holding holes 29 (see FIG. 3). Note that the holding holes 29 are holes that extend in the extension direction L.

In the present embodiment, one signal terminal 1 is allocated to one holding hole 29. In other words, the holder 2 includes the same number of holding holes 29 as signal terminals 1.

The holder 2 has a column shape that extends in the extension direction L, and includes a circular column-shaped body portion 23 that is the main body portion of the holder 2, a locking portion 25 that is arranged on the end portion on the electronic substrate side L2 of the body portion 23 and is relatively thicker than the body portion 23 (the diameter in the radial direction R that is orthogonal to the extension direction L is larger), holding holes 29 that are holes that extend in the extension direction L, and leg portions 28 that serve as three-dimensional barriers for the plug connector 120 and determine the insertion state of the plug connector 120.

The body portion 23 is inserted into the first shell 3 from the electronic substrate side L2 of the first shell 3 to the plug connector side L1. When the body portion 23 is inserted into the tube-shaped first shell 3, the locking portion 25 engages with the first shell 3 and determines the insertion position of the body portion 23 with respect to the first shell 3.

The leg portions 28 are members that extend in the form of columns along the extension direction L from the body portion 23 toward the plug connector side L1. As will be described later, the leg portions 28 are positioning portions that determine mutual insertion positions in the case where the plug connector 120 is inserted into and fit into the receptacle connector 10.

The first terminal portions 11 of the signal terminals 1 are inserted into the holding holes 29 of the holder 2.

The retaining protrusions 16 of the first terminal portions 11 are press-fit into the holding holes 29 from the electronic substrate side L2 of the holder 2, the holding holes 29 and the retaining protrusions 16 are engaged, and the signal terminals 1 are fixed to the holder 2.

The diameters of the holding holes 29 are formed to be the same as or slightly larger than the diameters of the signal terminals 1. Also, the diameters of the holding holes 29 are slightly smaller than the diameters of the portions of the retaining protrusions 16. This is done to enable the first terminal portions 11 of the signal terminals 1 to be inserted through the holding holes 29 without strain and to prevent the signal terminals 1 from easily falling off in the case where the retaining protrusions 16 of the first terminal portions 11 are press-fit into the holding holes 29.

Note that in the present embodiment, the insertion positions of the signal terminals 1 in the holder 2 are determined due to the end portions on the plug connector side L1 of the second bulging portions 14 being locked at the opening portions on the electronic substrate side L2 of the holding holes 29. That is, the holder 2 holds the portions on the electronic substrate side of the first terminal portions 11 of the signal terminals 1, or in other words, the approximate central portions of the signal terminals 1 in the holding holes 29. That is, the leading end portions on the plug connector side L1 of the first terminal portions 11 are not covered by the holder 2, but penetrate through and are exposed from the holder 2 to serve as terminal portions.

In the present embodiment, the holder 2 includes multiple (in the present embodiment, four) holding holes 29, which are holes that extend in the extension direction L in the body portion 23, and one signal terminal 1 is accurately positioned and held by one holding hole 29.

Also, the leg portions 28 are provided between some of the adjacent signal terminals 1. In the present embodiment, the leg portions 28 are provided between three of the four signal terminals 1.

As shown in FIGS. 2 to 5, the first shell 3 is a member that covers the outer circumferential side in the radial direction R of the holder 2. In other words, the first shell 3 is a member that corresponds to the outer conductor of the cable 130 and is an electrical protection member that protects the signal terminal 1 from electrical noise from the outer space E1.

The first shell 3 includes a body portion 38 serving as a main body portion of the first shell 3, and the body portion 38 includes, in order from the plug connector side L1 to the electronic substrate side L2, a polyhedron portion 36, a first engagement recessed portion 31 that is a groove-shaped recessed portion, a connection portion 37, and a second engagement recessed portion 39 that is a groove-shaped recessed portion. Leading-end protrusions 33 (see FIGS. 3 and 5) and engagement grooves 34 are provided on the leading end on the electronic substrate side L2 of the body portion 38 (see FIG. 3).

The first shell 3 is used as an electrical protection member and is formed of a material that shields electrical noise. Examples of materials that block electrical noise include resin compounds with a metal or a metal powder kneaded in, resin with metal plating, and the like.

In the present embodiment, the first shell 3 is formed of copper serving as a metal, and the surface thereof is plated with tin serving as a metal. The tin plating also prevents rusting of the first shell 3. The first shell 3 can be formed by cutting (i.e., formed by carving) a copper material, or can be molded in a mold, for example. The present example illustrates a case in which the first shell 3 is formed by cutting a copper material.

The first shell 3 is a tube-shaped member that extends in the extension direction L. As described above, the circular column-shaped holder 2 into which the signal terminal 1 is press-fit is inserted into the first shell 3. In other words, the axial center extending in the extension direction L of the column of the holder 2 and the axial center extending in the extension direction L of the cylinder of the first shell 3 match. That is, the axial center extending in the extension direction L of the cylinder of the first shell 3 matches the axial center direction of the cylinder of the first shell 3.

When the holder 2 is inserted into the first shell 3 from the electronic substrate side L2, the locking portion 25 of the holder 2 is locked by the engagement surface 32 (see FIG. 2) of the first shell 3 and thus movement toward the plug connector side L1 in the extension direction L is restricted.

The engagement surface 32 is a surface that is provided on the inner circumferential surface 3*a* (see FIG. 2) of the first shell 3, and is provided as a surface that intersects the extension direction L and opposes the space E2 (a surface that faces the electrode substrate side L2). In the present embodiment, the engagement surface 32 is orthogonal to the extension direction L in one mode of intersecting.

In order from the plug connector side L1 to the electronic substrate side L2, the first shell 3 includes: the tube-shaped body portion 38 into which the plug connector 120 fits; the polyhedron portion 36 that restricts rotation using the axis (axial center) extending in the extension direction L of the first shell 3 as a rotation axis P; the first engagement recessed portion 31 with which the first engagement hooks 81 engage; the tube-shaped connection portion 37 that is electrically connected to the second shell 7; the second engagement recessed portion 39 that engages with the spacer 9; the engagement groove 34 located at the end portion on the electronic substrate side L2 of the first shell 3; and the leading-end protrusions 33, which are located at the end portion on the electronic substrate side L2 of the first shell 3 and are protruding portions that extend in the extension direction L toward the electronic substrate side L2.

The first engagement recessed portion 31 is a ring-shaped groove portion (recessed portion) that is provided on the outer circumferential surface 3*b* of the first shell 3. The cross-section of the groove of the first engagement recessed portion 31 is approximately rectangular.

The first engagement recessed portion 31 is an engagement portion with which the first engagement hooks 81 engage.

The first engagement recessed portion 31 is located between the polyhedron portion 36 and the connection portion 37 and is a groove relative to the polyhedron portion 36 and the connection portion 37.

The first shell 3 is contained in the connector case 8 in a state of being locked by the connector case 8 due to the engagement between the first engagement hooks 81 and the first engagement recessed portion 31 (see FIG. 2). In the state in which the first shell 3 is contained in (mounted in, attached to) the connector case 8, movement in the extension direction L of the first shell 3 (signal terminals 1) with respect to the connector case 8 is restricted.

If the first shell 3 is inserted in the extension direction L from the electronic substrate side L2 of the connector case 8 to be contained in and mounted in the connector case 8, the first engagement hooks 81 of the connector case 8 engage with the first engagement recessed portion 31 of the first shell 3.

The polyhedron portion 36 includes multiple (in the present embodiment, four) flat portions 36*b* that extend in the extension direction L. In the present embodiment, planar chamfered portions 36*a* obtained by chamfering the peaks of adjacent flat portions 36*b* are included. In the present embodiment, four flat portions 36*b* are included.

The first shell 3 is contained in the connector case 8 in a state in which the chamfered portions 36*a* oppose the protruding portions 83 of the connector case 8. The flat portion 36*b* engages with the protruding portion 83 (see FIG. 6) in the manner of a three-dimensional barrier, and thus prevents rotation using the axis extending in the extension direction L of the first shell 3 as the rotation axis P.

The second engagement recessed portion 39 is provided as a circular ring-shaped recessed portion on the outer circumferential surface 3*b* of the first shell 3, the second engagement recessed portion 39 being the portion with which the later-described second engagement hooks 96 engage.

The engagement grooves 34 are cut-outs provided along the circumferential direction of the connection portion 37 of the first shell 3 on the end portion on the electronic substrate side L2 of the first shell 3. In the present embodiment, the engagement grooves 34 are provided between adjacent leading end protrusions 33 at regular intervals. The present embodiment shows a case in which the leading-end protrusions 33 and the engagement grooves 34 are provided alternatingly. Also, the present embodiment shows a case in which four each of the leading-end protrusions 33 and the engagement grooves 34 are provided at regular intervals.

Note that the outer conductor of the cable 130 is electrically connected to the first shell 3. Also, since the first shell 3 and the second shell 7 are electrically connected as will be described later, if the second shell 7 is connected to the ground of the camera module 110, the grounds of the first shell 3 and the cable 130 are also electrically connected to the ground of the camera module 110.

The inner seal member 4 is an elastic member, and as shown in FIGS. 2 and 3, it is a sealing member that seals the gap between the first shell 3 and the connector case 8 in the extension direction L. In the present embodiment, a circular column-shaped rubber-like member that extends in the extension direction L is used as the inner seal member 4.

The inner seal member 4 is formed of a rubber-like member, which is an example of an elastic member, for example. In particular, a rubber material is used as the rubber-like member. For example, silicone rubber or a silicone sponge is preferable as the rubber material. A rubber impregnated with an oil such as silicone oil is more preferably used as the rubber material.

In the present embodiment, silicone rubber impregnated with silicone oil is used as the inner seal member 4.

The inner seal member 4 includes insertion holes 49 (see FIG. 3) into which the signal terminals 1 are press-fit, and in a state in which the outer circumferential portion 4*a* of the outer side R2 in the radial direction R of the inner seal member 4 is pressed into contact with the inner circumferential surface 3*a* of the inner side R1 in the radial direction R of the first shell 3, the interior of the first shell 3 is sealed in the extension direction L and is thus waterproofed.

Note that the insertion holes 49 are pressed into contact with the signal terminals 1 at the second bulging portions 14, at which the signal terminals 1 have larger outer diameters than at other portions. Since the inner seal member 4 is an elastic member, it is pressed into contact with the signal terminals 1 by being flexibly deformed according to the outer diameters of the second bulging portions 14. The diameters of the insertion holes 49 are the same as or slightly smaller than the diameters of the second bulging portions 14. This is because if the signal terminals 1 are inserted into the insertion holes 49, a state is entered in which the signal terminals 1 are pressed into contact therewith by the inner seal member 4.

In the present embodiment, one signal terminal 1 is allocated to one insertion hole 49. In other words, there are as many insertion holes 49 as there are signal terminals 1.

In the present embodiment, the inner seal member 4 is arranged by being inserted between the holder 2 and the spacer 9.

The surface 42 on the electronic substrate side L2 of the inner seal member 4 is locked by a surface 97*a* on the connector side of the support portion 97 of the spacer 9. In the present embodiment, as one mode of locking, the surface 42 on the electronic substrate side L2 is in contact with the surface 97*a* on the connector side of the support portion 97 of the spacer 9. In other words, the inner seal member 4 is restricted from moving to the electronic substrate side L2 by the spacer 9. Note that the support portion 97 of the spacer 9 will be described later.

Also, the surface 41 on the plug connector side L1 of the inner seal member 4 is locked by the surface 22 on the electronic substrate side L2 of the holder 2. In the present embodiment, as a mode of locking, the surface 41 on the plug connector side L1 is in contact with the surface 22 on the electronic substrate side L2 of the holder 2. In other words, the inner seal member 4 is restricted from moving to the plug connector side L1 by the holder 2.

In other words, the inner seal member 4 is restricted from moving in the extension direction L due to being interposed between the spacer 9 and the holder 2. Since the inner seal member 4 can be fixed in this manner by merely being interposed between the spacer 9 and the holder 2, it has excellent ease of assembly.

An integrated terminal module 30 (see FIG. 4) is obtained when the holder 2 through which the signal terminals 1 are inserted and the inner seal member 4 are inserted into the first shell 3 from the electronic substrate side L2. The terminal module 30 can be assembled easily by merely inserting the signal terminals 1, the holder 2, and the inner seal member 4 into the first shell 3.

With a simple operation of merely inserting the terminal module 30 into the cylindrical space E3 from the electronic substrate side L2 of the connector case 8 so that it is contained in the connector case 8, the terminal module 30 can be mounted in the connector case 8, and excellent ease of assembly is achieved.

Note that in the case of connecting the receptacle connector 10 and the plug connector 120, the first shell 3 sometimes includes a socket-side seal member 5 that seals the gap between the first shell 3 and the plug connector 120 and makes it waterproof. A case in which the first shell 3 includes the socket-side seal member 5 will be described hereinafter.

The outer seal member 6 is an elastic member, and as shown in FIGS. 2 and 4, it is a sealing member that seals the portion on the inner side R1 of the first shell 3 in the extension direction L. In the present embodiment, a circular ring-shaped rubber-like member is used as the outer seal member 6.

The outer seal member 6 is formed of a rubber-like member, which is an example of an elastic member, for example. In particular, a rubber material is used as the rubber-like member. For example, silicone rubber or a silicone sponge is preferable as the rubber material. A rubber impregnated with an oil such as silicone oil is more preferably used as the rubber material.

In the present embodiment, silicone rubber impregnated with silicone oil is used as the outer seal member 6.

The outer seal member 6 seals and waterproofs the interior of the cylindrical space E3 in the extension direction L in a state in which the outer circumferential portion 6*b* on the outer side R2 in the radial direction R is pressed into contact with the inner circumferential surface 8*a* (inner circumferential surface of the ring-shaped extension portion 82) of the connector case 8 that forms the cylindrical space E3 and the inner circumferential portion 6*a* on the inner side R1 in the radial direction R is pressed into contact with the outer circumferential surface 3*b* on the outer side R2 in the radial direction R of the first shell 3.

The outer seal member 6 is arranged on the plug connector side L1 with respect to the second shell 7 and the spacer 9.

The outer shell seal 6 is installed on the first shell 3. And the surface 61 on the plug connector side L1 is locked by the connector case 8. In the present embodiment, as a mode of locking, the surface 61 on the plug connector side L1 comes into contact with the connector case 8.

In the present embodiment, the surface 61 is a surface that is provided on the inner circumferential surface 8*a* of the connector case 8, and the outer seal member 6 is locked by the outer seal contact surface 86, which is a surface that is orthogonal to and intersects the extension direction L and faces the space E2. In other words, the outer seal member 6 is restricted from moving toward the plug connector side L1 by the inner circumferential surface 8*a* of the connector case 8.

The surface 62 on the electronic substrate side L2 is locked by the second shell 7 and the outer seal member 6 is installed on the first shell 3. In the present embodiment, as a mode of locking, the surface 62 on the electronic substrate side L2 is in contact with the second shell 7. In other words, the outer seal member 6 is restricted from moving to the electronic substrate side L2 by the second shell 7.

In this manner, the outer seal member 6 is restricted from moving in the extension direction L due to being interposed between the connector case 8 and the second shell 7.

The outer seal member 6 is mounted with a simple operation of being inserted into the terminal module 30 (first shell 3) contained in the connector case 8 from the electronic substrate side L2 of the connector case 8 and being enclosed by the second shell 7 from the electronic substrate side L2 of the connector case 8, and thereby excellent ease of assembly is achieved.

As shown in FIGS. 2, 4, and 5, the second shell 7 is an electrical protection member (a so-called shield) that shields the electronic substrate side L2 from electrical noise and protects the electrical signals flowing in the signal terminals 1 and the members on the electronic substrate side L2 in the extension direction L with respect to the second shell 7, such as the camera module 110 serving as the electronic substrate, from electrical noise.

The second shell 7 is supported by and contained in the portion of the space E2 of the connector case 8 while being accurately positioned by the ring-shaped extension portion 82 and the protrusions 85.

The second shell 7 is used as an electrical protection member and is formed of a material that blocks electrical noise. Examples of materials that block electrical noise include resin compounds with a metal or a metal powder kneaded in, resin with metal plating, and the like.

In the present embodiment, the second shell 7 is formed of copper serving as a metal, and the surface thereof is plated with tin serving as a metal. The tin plating also prevents rusting of the first shell 3. The second shell 7 can be formed by bending a copper material, for example.

The second shell 7 is provided on the electronic substrate side L2 of the connector case 8 so as to cover the space E2 on the electronic substrate side L2 of the receptacle connector 10 from the plug connector side L1 to the electronic substrate side L2 (such that one surface is surrounded from the plug connector side L1 to the electronic substrate side L2). The connector case 8 includes a rectangular tube-shaped space as the space E2, for example, and the second shell 7 is contained in the rectangular tube-shaped space.

The second shell 7 is provided as a bottomed tube-shaped conductive member that has a bottom portion 71 and side wall portions 72, an inner side of the tube facing the electronic substrate side.

The side wall portions 72 are provided so as to be bent from the periphery of the bottom portion 71 and extend to the electronic substrate side L2 in the extension direction L. In other words, the side wall portions 72 are a body portion serving as a tube of the bottomed tube-shaped second shell 7.

The second shell 7 protects the electrical signals that flow in the signal terminals 1 and the electrical signals that are to be processed by the electronic substrate by covering the space E2 with a bottomed tube shape formed mainly by the bottom portion 71 and the side wall portions 72 and shielding the space E2 from electrical noise in the outer space E1.

An opening portion 73 whose center is penetrated by the first shell 3 is included on the bottom portion 71, and the opening portion 73 includes a protruding portion 75 that is bent from the opening edge portion 73*e* of the opening portion 73 and extends to the electronic substrate side L2 in the extension direction L.

The second shell 7 is joined by being fit over the first shell 3 at the protruding portion 75.

The second shell 7 is arranged on the first shell 3 in a state in which the outer circumferential surface 3*b* of the first shell 3 and the inner circumferential surface 75*a* in the radial direction R of the protruding portion 75 are in surface contact with each other (in a fit-together state). The first shell 3 and the second shell 7 are both formed of a conductive material, such as a metal, and therefore the first shell 3 and the second shell 7 are also electrically connected by being fit together in this manner.

The connection portion 37 of the first shell 3 is press-fit into the containing space E4 (see FIG. 4) of the protruding portion 75 of the second shell 7, and the outer circumferential surface 3*b* of the first shell 3 (connection portion 37) is pressed into contact with the inner circumferential surface 75*a* of the protruding portion 75. Accordingly, the first shell 3 and the second shell 7 are joined without there being a gap at the edge portion (opening edge portion 73*e*) of the opening portion 73 in the bottom portion 71 of the second shell 7. Accordingly, entrance of electromagnetic waves from the outer space E1 into the space E2, leakage of electromagnetic waves from the space E2 to the outer space E1, and the like can be suitably suppressed.

In this manner, the second shell 7 is arranged such that the first shell 3 penetrates through the bottom portion 71 of the second shell 7, or in other words, is arranged such that the bottom portion 71 of the second shell 7 intersects (in the present embodiment, is orthogonal to, as a mode of intersecting) the extension direction L of the signal terminal 1, and the second shell 7 in this arrangement covers the electronic substrate side L2 with the side wall portions 72, the protruding portion 75, and the bottom portion 71, which protrude to the electronic substrate side L2. The second shell 7 protects the members on the electronic substrate side L2 in the extension direction L with respect to the second shell 7, such as the signal terminal 1 (the second terminal portion 12) and the camera module 110, and electrical signals to be processed by those members by shielding them from electrical noise.

As shown in FIGS. 2, 4, and 5, the spacer 9 is a base on which the camera module 110 serving as the electronic substrate is mounted.

The spacer 9 includes a surface portion 91 serving as the base, and a spacer wall 92 that extends in the extension direction L from the outer circumference of the surface portion 91 to the plug connector side L1.

The spacer 9 is formed of resin serving as an insulator. For example, nylon resin, vinyl chloride resin, polyethylene resin, or the like can be used as the resin. In the present embodiment, the spacer 9 is formed of the same resin as the connector case 8 is.

The surface portion 91 is a circular flat plate with the same axial center as the axial center that extends in the extension direction L of the cylinder of the first shell 3. The surface portion 91 is orthogonal to and intersects the extension direction L.

The surface portion 91 includes: a support portion 97 that includes insertion holes 99 that are penetrated by the signal terminals 1 and accurately position and support the signal terminals 1; second engagement hooks 96 that are hooks that engage with the second engagement recessed portion 39 and have elastic forces along the radial direction R; and beam portions 95 that hold the support portion 97 on the surface portion 91. Also, in the surface portion 91, one opening portion 93 is formed for one second engagement hook 96.

The second engagement hooks 96 are bent at portions relatively on the inner side R1 starting from a position displaced relatively toward the outer side R2 of the surface portion 91, and the second engagement hooks 96 protrude (extend) in the extension direction L to the plug connector side L1 and are arranged on the outer side R2 in the radial direction R of the support portion 97. The second engagement hooks 96 engage with the second engagement recessed portions 39 and the second engagement hooks 96 and the second engagement recessed portions 39 mutually restrict movement in the extension direction L.

The spacer 9 is locked to the first shell 3 due to the engagement between the second engagement hooks 96 and the second engagement recessed portions 39, and thus movement in the extension direction L with respect to the connector case 8 is restricted.

In the present embodiment, the adjacent second engagement hooks 96 are arranged at even intervals.

In the present embodiment, four second engagement hooks 96 are provided.

One opening portion 93 is formed on a portion in the periphery of each second engagement hook 96 (portion on the inner side R1 of the surface portion 91).

The beam portions 95 are portions of the surface portion 91 between adjacent opening portions 93.

The beam portions 95 engage with the engagement grooves 34 and restrict the spacer 9 from rotating with respect to the first shell 3 using the axis (axial center) extending in the extension direction L as the rotation axis P.

Specifically, in the state in which the second engagement hooks 96 and the second engagement recessed portions 39 are engaged, or in other words, in the state in which the spacer 9 is attached to the first shell 3, a case in which the spacer 9 rotates with respect to the first shell 3 using the axis (axial center) extending in the extension direction L as the rotation axis P is restricted using a mode in which the beam portions 95 fit into the engagement grooves 34.

In this manner, the spacer 9 is restricted from moving in the extension direction L with respect to the first shell 3 and from rotating with respect to the first shell 3 using the axis (axial center) extending in the extension direction L as the rotation axis P. Here, as described above, the first shell 3 is restricted from moving with respect to the connector case 8 in the extension direction L of the first shell 3, and is restricted from rotating with respect to the connector case 8 using the axis (axial center) extending in the extension direction L as the rotation axis P. For this reason, the spacer 9 is restricted from moving with respect to the connector case 8 in the extension direction L and from rotating with respect to the connector case 8 using the axis (axial center) extending in the extension direction L as the rotation axis P.

In other words, due to the engagement between the second engagement hooks 96 and the second engagement recessed portion 39, the spacer 9 is restricted from moving in the extension direction L with respect to the connector case 8, and due to the engagement between the beam portions 95 and the engagement grooves 34, the spacer 9 is restricted from rotating with respect to the connector case 8 using the axis (axial center) extending in the extension direction L as the rotation axis P.

The insertion holes 99 are holes that are penetrated by and support the signal terminals 1 and that extend in the extension direction L.

In the state in which the leading end portions of the second terminal portions 12 are caused to protrude toward the electronic substrate side L2, the signal terminals 1 are accurately positioned and arranged by being inserted through the insertion holes 99 of the support portion 97. The purpose of this is to electrically connect to the camera module 110 mounted on the surface portion 91.

In the present embodiment, one signal terminal 1 is allocated to one insertion hole 99.

If the spacer 9 is inserted in the terminal module 30 (first shell 3) contained in the connector case 8 from the electronic substrate side L2 of the connector case 8, it can be mounted easily due to the engagement between the second engagement hooks 96 and the second engagement recessed portion 39. In the case of mounting the spacer 9 in the terminal module 30, the signal terminals 1 are positioned accurately by being held by the holding holes 29, and therefore it is easy to perform an operation of inserting the multiple signal terminals 1 into the corresponding insertion holes 99.

The spacer 9 thus has excellent ease of assembly.

Since there are multiple, that is, four signal terminals 1, four insertion holes 99 are provided as the insertion holes 99 of the spacer 9 of the present embodiment. In this case, the number of holding holes 29 of the holder 2 that are provided is the same as the number of insertion holes 99. Also, the insertion holes 99 and the holding holes 29 are provided at corresponding positions. In other words, the distance and positional relationship between the adjacent insertion holes 99 are the same as the distance and positional relationship between the adjacent holding holes 29. In other words, the arrangement of the multiple insertion holes 99 and the arrangement of the holding holes 29 are the same.

Note that the insertion holes 49 also similarly have an arrangement similar to those of the insertion holes 99 and the holding holes 29.

Accordingly, if there are two or more signal terminals 1, the spacer 9 and the holder 2 restrict each other via the two or more signal terminals 1 in the direction of rotation using the axis (axial center) extending in the extension direction L of the first shell 3 as the rotation axis P. That is, the spacer 9 and the holder 2 are in a relationship of being mutually fixed in the direction of rotation using the axis (axial center) extending in the extension direction L of the first shell 3 as the rotation axis P.

Here, since the spacer 9 is in a state of being restricted from moving with respect to the connector case 8 in the extension direction L and from rotating with respect to the connector case 8 using the axis (axial center) extending in the extension direction L as the rotation axis P, the connector case 8 and the holder 2 are in a relationship of being mutually fixed in the direction of rotation using the axis (axial center) extending in the extension direction L of the first shell 3 as the rotation axis P.

In other words, in a state in which the signal terminals 1 penetrate the multiple insertion holes 99, the spacer 9 restricts rotation of the holder 2 with respect to the connector case 8 using the axis (axial center) extending in the extension direction L as the rotation axis P. Accordingly, the holder 2 and the signal terminals 1 are accurately positioned with a simple structure, a high assembly accuracy is maintained, a case in which the positions of the signal terminals 1 shift is avoided during use, accidents such as short-circuiting can be prevented, and high safety can be provided.

The support portion 97 is formed so as to protrude in the form of a circular column in the extension direction L from the surface portion 91 to the plug connector side L1. The spacer 9 of the present embodiment is arranged in a state in which a portion of the support portion 97 that protrudes in the form of a circular column toward the plug connector side L1 is inserted into the first shell 3. For this reason, the inner seal member 4 enters an arrangement state of being pressed into the first shell 3 by the support portion 97 that protrudes in the form of a circular column toward the plug connector side L1.

In the present embodiment, the insertion holes 99 are supported so as to cover the first bulging portions 13 and the adjustment portions 15 of the signal terminals 1. Accordingly, the diameters of the insertion holes 99 are larger than the diameters of the first terminal portions 11 and the second terminal portions 12 of the signal terminals 1.

The support portion 97 including the insertion holes 99 is a circular column that extends in the extension direction L, but in some cases, the lengths of the first bulging portions 13 and the adjustment portions 15 of the signal terminals 1 are changed by changing the length in the extension direction L of the circular column-shaped support portion 97. Also, in some cases, the diameters of the first bulging portions 13 and the adjustment portions 15 of the signal terminals 1 are changed by changing the diameters of the insertion holes 99. In other words, in some cases, the characteristic impedance of the receptacle connector 10 is adjusted by changing the length in the extension direction L or the diameter of the support portion 97.

Additional description of the arrangement of the holder 2, the inner seal member 4, the outer seal member 6, the second shell 7, and the spacer 9 according to the present embodiment will be included here.

In the present embodiment, the spacer 9 is arranged on the electronic substrate side L2 with respect to the holder 2, and the inner seal member 4 is arranged between the spacer 9 and the holder 2.

This is because the inner seal member 4 is interposed between the spacer 9 and the holder 2 to restrict the movement of the inner seal member 4 in the extension direction.

In the present embodiment, the surface 97*a* on the plug connector side L1 of the support portion 97 of the spacer 9 is brought into contact with the surface 42 on the electronic substrate side L2 of the inner seal member 4 from the electronic substrate side L2, whereby movement of the inner seal member 4 toward the electronic substrate side L2 in the extension direction L is restricted.

In the present embodiment, the spacer 9 is arranged on the electronic substrate side L2 with respect to the second shell 7.

This is because the second shell 7 is locked by the spacer 9. Also, this is because the second shell 7 is arranged on the first shell 3 in the state in which the second shell 7 is restricted from moving with respect to the first shell 3 in the extension direction L.

In the present embodiment, the surface on the electronic substrate side L2 of the second shell 7 is locked by the end portion 92*a* on the plug connector side L1 of the spacer wall 92.

In other words, in a state in which the second shell 7 is penetrated by the first shell 3 (terminal module 30) at the opening portion 73, the second shell 7 is interposed between the connector case 8 and the spacer 9, whereby movement of the second shell 7 in the extension direction is restricted.

The second shell 7 is arranged on the electronic substrate side L2 with respect to the outer seal member 6.

This is because the surface 62 on the electronic substrate side L2 of the outer seal member 6 is locked by the surface on the plug connector side L1 of the bottom portion 71 of the second shell 7 and is thus installed on the first shell 3.

In other words, the outer seal member 6 is interposed between the connector case 8 (inner circumferential surface 8*a*) and the bottom portion 71 of the second shell 7, whereby movement of the outer seal member 6 in the extension direction is restricted.

Since the outer seal member 6 can be fixed in this manner by merely being interposed between the second shell 7 and the connector case 8, it has excellent ease of assembly.

Additional description of one mode of assembly of the receptacle connector 10 will be given next mainly with reference to FIGS. 2 to 4.

The receptacle connector 10 can be assembled through the following simple procedure.

First, the holder 2 is inserted into the first shell 3. In this state, the signal terminal 1 is inserted through the holder 2 through press-fitting.

Next, the inner seal member 4 is press-fit into the signal terminals 1. In other words, the signal terminals 1 inserted through the holder 2 are press-fit into the inner seal member 4.

Thus assembly of the terminal module 30 is complete.

Next, the terminal module 30 (first shell 3) is contained by being inserted into the connector case 8 from the electronic substrate side L2. When the terminal module 30 is contained in the connector case 8, the terminal module 30 and the connector case 8 are engaged, and the terminal module 30 is fixed to and installed in the connector case 8.

Next, the outer seal member 6 is fit into the terminal module 30 (first shell 3).

Thereafter, the second shell 7 is press-fit into the terminal module 30 (first shell 3) and is contained in the space E2 of the connector case 8.

Thereafter, the spacer 9 is attached to the terminal module 30 (first shell 3) from the electronic substrate side L2.

Thus assembly of the receptacle connector 10 is complete.

Description of Connector

Figure 8:
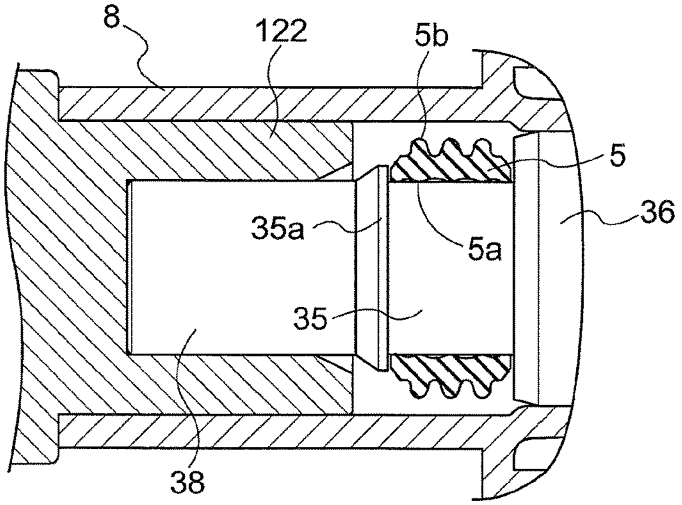
FIG. 8 is a schematic cross-sectional view of a connection portion of a connector in a case of exhibiting a waterproofing function.
Figure 9:
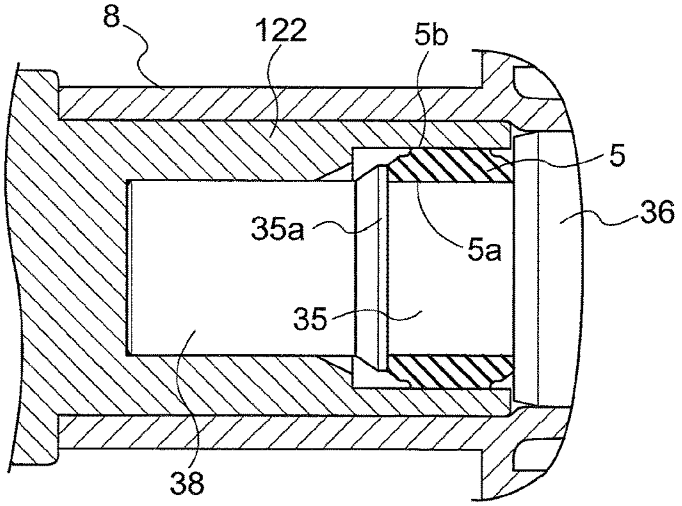
FIG. 9 is a schematic cross-sectional view of a connection portion of a connector in a case of not exhibiting a waterproofing function.

As shown in FIGS. 7 to 9, the receptacle connector 10 and the plug connector 120 can be used as a pair of connectors 20, using the receptacle connector 10 and the plug connector 120 that is connected by being inserted into the cylindrical space E3 of the connector case 8 from the plug connector side L1 of the receptacle connector 10.

To give an illustrative example of a mode of the plug connector 120, the plug connector 120 includes a connection tube portion 122 that overlaps with the body portion 38 of the first shell 3 in a view in the radial direction in a state of being inserted into at least the connector case 8 (see FIGS. 8 and 9).

In the present embodiment, a case is illustrated in which the first shell 3 and the connection tube portion 122 overlap (in the present invention, as a mode of overlapping, the first shell 3 is fit into the connection tube portion 122) in a view in the radial direction in a state in which the connection tube portion 122 fits over the body portion 38 of the first shell 3, but in some cases, the first shell 3 and the connection tube portion 122 overlap in a state in which the connection tube portion 122 fits inside of the body portion 38 of the first shell 3 (not shown).

In this manner, in a state in which the first shell 3 and the connection tube portion 122 overlap in a view in the radial direction, the connection terminal portion (not shown) of the plug connector 120 is electrically connected to the plug connector side L1 of the signal terminal 1.

Hereinafter, the state in which the connection terminal portion (not shown) of the plug connector 120 is electrically connected to the plug connector side L1 of the signal terminal 1 with the first shell 3 and the connection tube portion 122 overlapping will simply be written as "connection is complete".

In the present embodiment, a case is illustrated in which the plug connector 120 includes: a retaining pin 121 that includes a protrusion 121*a* and engages with the retaining reception portion 88, which is a retaining mechanism on the receptacle connector 10 side; a gripping portion 124 by which the user grips the plug connector 120; and positioning portions 123 that engage with the positioning grooves 8*b* provided on the inner circumferential surface 8*a* of the connector case 8 to determine the position of inserting the plug connector 120 into the receptacle connector 10.

The retaining pin 121 is a retaining mechanism on the plug connector 120 side for preventing unintended falling out in the state in which the plug connector 120 is connected to the receptacle connector 10 and for ensuring maintenance of the state in which connection is complete.

In the state in which the retaining pin 121 is inserted into the retaining reception portion 88, the protrusion 121*a* engages with the recessed portion of the retaining reception portion 88, and movement of the plug connector 120 in the direction of falling out of the receptacle connector 10 is restricted.

When the connection is complete, it is possible to perform communication and power supply with the camera module 110 that serves as the electronic substrate and to which the cable 130 and the receptacle connector 10 are attached.

Thus, in the state in which connection is complete, if the first shell 3 further includes the socket-side seal member 5 that seals the gap between the first shell 3 and the connection tube portion 122, the gap between the first shell 3 and the connection tube portion 122 of the plug connector 120 is sealed by the socket-side seal member 5, whereby water is prevented from entering the inner side R1 of the second shell 7 from the outer side R2 of the connection tube portion 122, which is preferable.

In the present embodiment, an example is shown in which the socket-side seal member 5 is arranged at the position at which the first shell 3 and the connection tube portion 122 overlap.

The socket-side seal member 5 is a circular column-shaped elastic member that extends in the extension direction L. In the present embodiment, a rubber member is used as the elastic member. In particular, a rubber material is used as the rubber member. For example, silicone rubber or a silicone sponge is preferable as the rubber material. A rubber impregnated with an oil such as silicone oil is more preferably used as the rubber material.

In the present embodiment, silicone rubber impregnated with silicone oil is used as the socket-side seal member 5.

The socket-side seal member 5 is fixed by being fit into a waterproofing recessed portion 35 of the first shell 3.

In the present embodiment, a case is shown in which a waterproofing recessed portion 35 is relatively formed as a groove portion by a surface 35*b* on the connector side of the polyhedron portion 36 and a waterproofing protrusion 35*a* that is located on the connector side relative to the surface 35*b* and protrudes from the outer circumferential surface 3*b* of the first shell 3 to the outer side R2.

Note that the waterproofing recessed portion 35 is provided on the outer circumferential surface 3*b* of the body portion 38 as a groove portion.

That is, with the socket-side seal member 5, the plug connector side L1 of the socket-side seal member 5 is locked by the waterproofing protrusion 35*a* and the electronic substrate side L2 of the socket-side seal member 5 is locked by the surface 35*b* of the polyhedron portion 36.

In the state in which the socket-side seal member 5 is fit into the waterproofing recessed portion 35, the inner circumferential portion 5*a*, which is the inner side R1 of the socket-side seal member 5 seals the gap between the first shell 3 and the socket-side seal member 5 by being pressed into contact with the outer circumferential surface 3*b* of the first shell 3.

In the state in which the socket-side seal member 5 is connected to the plug connector 120, the outer circumferential portion 5*b*, which is the outer side R2 of the socket-side seal member 5 seals the gap between the connection tube portion 122 and the socket-side seal member 5 due to being pressed into contact with the surface on the inner-side R1 of the connection tube portion 122 (see FIG. 9).

In other words, in the state in which connection with the plug connector 120 is complete, the socket-side seal member 5 exhibits a waterproofing effect from the outer side of the connection tube portion 122 to the inner side of the first shell (hereinafter referred to as the "waterproofing effect of the socket-side seal member 5") due to the gap between the first shell 3 and the connection tube portion 122 of the plug module being sealed by the socket-side seal member 5.

Note that in the case where the first shell 3 includes the socket-side seal member 5 that seals the gap between the first shell 3 and the connection tube portion 122, if a connection tube portion 122 in which the end portion on the electronic substrate side of the connection tube portion 122 is located on the connector side relative to the waterproofing protrusion 35*a* in the state in which connection is complete, it is possible to disable the waterproofing function of the socket-side seal member 5.

For example, the waterproofing function is enabled in the case of using the plug connector 120 having a length in the extension direction L of a degree such that the connection tube portion 122 overlaps with the socket-side seal member 5 in the state in which connection is complete (see FIG. 9), and the waterproofing function can be disabled in the case of using the plug connector 120 having a length in the extension direction L of a degree such that the connection tube portion 122 does not overlap with the socket-side seal member 5 in the state in which connection is complete (e.g., a length according to which the end portion on the electronic substrate side of the connection tube portion 122 is located on the connector side with respect to the waterproofing protrusion 35*a* in the state in which connection is complete) (see FIG. 8).

That is, different plug connectors 120 can be used in the case of exhibiting the waterproofing function (the case of FIG. 9) and in the case of not exhibiting the waterproofing function (the case of FIG. 8).

In other words, the receptacle connector 10 illustrated in the present embodiment can be fit together in both the case in which the plug connector 120 exhibits the waterproofing function and the case in which the plug connector 120 does not exhibit the waterproofing function.

For example, the receptacle connector 10 can be used as a receptacle connector 10 that is interchangeable with both a new plug connector 120 of a relatively new standard for exhibiting the waterproofing function, and a relatively old model of plug connector 120 (e.g., a plug connector 120 that has conventionally been used) that does not include the waterproofing function.

Description of Case of being Used in Camera Unit

Hereinafter, one mode of a case in which the receptacle connector 10 is attached to the camera module 110 and used as the camera unit 100 (vehicle-mounted camera) mounted in a vehicle will be described with reference to FIG. 1.

Hereinafter, a mode of such a camera unit 100 will be described as an example.

For example, the receptacle connector 10 (connector 20) transmits the signals transmitted by the cable 130 to the camera module 110 and receives the signals transmitted by the cable 130 from the camera module 110. Furthermore, in order for the power for driving that is supplied from the cable 130 to be supplied to the camera module 110, the receptacle connector 10 is used while connected to the camera module 110.

The camera module 110 can be used in a mode in which an electronic substrate (not shown; a printed circuit board or a flexible printed circuit board can be given as an example of the electronic substrate) is mounted on the spacer 9. For example, in a state in which engagement portions (not shown) corresponding to the leading end protrusions 33 are provided in the substrate of the camera module 110 and the camera module 110 is mounted on the spacer 9 (see FIG. 5), the camera module 110 is locked (being fixed is an example of being locked) to the leading end protrusions 33. In this manner, since the receptacle connector 10 includes the spacer 9, which includes a flat surface on the electronic substrate side L2, the receptacle connector 10 can easily mount the substrate of the camera module 110 and thus has excellent mountability. Moreover, the signal terminals 1 are electrically connected to the circuit wiring on the substrate through a method such as soldering.

In the camera unit 100, the connector case 8 is located on the plug connector side L1 relative to the camera module 110, and therefore is referred to as a "rear case" in some cases.

The camera module 110 is preferably contained in the main body case 89.

In the camera unit 100, the main body case 89 is sometimes referred to as a "front case" in contrast to the connector case 8, which is referred to as the "rear case". The containing space inside of which the terminal module 30, the second shell 7, the camera module 110, and the like are contained is formed due to the connector case 8 and the main body case 89 coming into contact with each other.

Hereinafter, an example of the camera module 110 will be described.

The camera module 110 is an example of an electronic substrate, and includes at least an image sensor 101, an electronic circuit 102 that performs control for driving the image sensor 101 and processes image signals output from the image sensor 101, and an optical system 104 that includes a lens 103 that focuses light on the image sensor 101.

The camera unit 100 is connected to an image processing apparatus (not shown) and a monitor apparatus (not shown) via the cable 130. The cable 130 supplies power to the image sensor 101 of the camera unit 100 and the electronic circuit 102 from the image processing apparatus and the monitor apparatus, and outputs signals of images output from the image sensor 101 and the electronic circuit 102 to the image processing apparatus and the monitor apparatus via the cable 130. In other words, the camera unit 100 is an image capturing apparatus using a known power source superposition scheme.

The image sensor 101 of the camera module 110 is a CCD (Charge Coupled Device) sensor or a CIS (CMOS Image Sensor). There is no limitation to using one lens 103, and multiple lenses 103 may be used. The electronic circuit 102 includes a clock driver for driving the image sensor 101 and an analog signal processing circuit for carrying out analog signal processing such as sample holding or clamp processing on analog signals output from the image sensor 101. The electronic circuit 102 may further include an A/D converter for converting analog signals into digital signals. Also, the electronic circuit 102 may include a power source circuit for performing processing such as rectification on the power source supplied using the power source superposition scheme.

Note that the electronic circuit 102 is configured as an electronic substrate obtained by mounting electronic components on one or multiple substrates (e.g., printed circuit boards). In the case of using multiple electronic substrates, flexible circuit boards may be used to electrically connect the electronic substrates. The receptacle connector (not shown) for connecting the cable 130 via the plug connector 120 is also mounted on the electronic substrate on which the electronic circuit 102 is formed. The plug connector 120 is connected to the receptacle connector 10 and is connected to the cable 130 as well, whereby the camera module 110 including the electronic circuit 102 and the cable 130 are electrically connected.

Additional description will be given hereinafter for the role (effect) of the second shell 7 in the camera unit 100.

As described above, as one mode, on the electronic substrate side of the spacer 9 in the receptacle connector 10, the camera unit 100 (vehicle-mounted camera) includes a camera module 110 having the image sensor 101, the electronic circuit 102 for performing driving control on the image sensor 101 and processing image signals output from the image sensor 101, and an optical system 104 that includes a lens 103 for collecting light in the image sensor 101.

The second shell 7 functions to protect the members (at least a portion of the electronic circuit 102) that are included in the camera module 110 and are located on the electronic substrate side in the extension direction L relative to the second shell 7, by shielding them from electrical noise in the outer space E1.

In this manner, with a simple structure in which the inner seal member 4 and the outer seal member 6 are merely added, it is possible to provide a receptacle connector 10 including an added function of preventing water from entering from the plug connector side L1 to the electronic substrate side L2.

Also, with a simple structure in which the inner seal member 4, the outer seal member 6, and the socket-side seal member 5 are merely added, it is possible to provide a connector 20 that includes an added function of preventing water from entering from the plug connector side L1 to the electronic substrate side L2.

Other Embodiments

Hereinafter, other embodiments will be described. Note that the configurations of the embodiments described hereinafter are not limited to being applied separately, and can be applied in combination with configurations of other embodiments as long as no discrepancies occur.

(1) The above-described embodiment illustrates a case in which the connection portion 37 of the first shell 3 is press-fit into the containing space E4 of the protruding portion 75 of the second shell 7 as the joining between the first shell 3 and the second shell 7.

However, the joining between the first shell 3 and the second shell 7 is not limited to being achieved by press-fitting. The first shell 3 and the second shell 7 may be joined by welding, adhering, or soldering the opening edge portion 73*e* after the first shell 3 is inserted into the containing space E4 of the protruding portion 75.

(2) The above-described embodiment illustrates a case in which the spacer 9 is locked to the first shell 3 due to engagement between the second engagement hooks 96 and the second engagement recessed portion 39.

However, instead of locking the spacer 9 to the first shell 3 by engaging the second engagement hooks 96 and the second engagement recessed portion 39, the spacer 9 may be locked to the first shell 3 by fitting the support portion 97 into the first shell 3 (e.g., fitting the support portion 97 into the first shell 3 through press-fitting), for example.

(3) The above-described embodiment illustrates a case in which the support portion 97 is formed so as to protrude in the form of a circular column from the surface portion 91 to the plug connector side L1 in the extension direction L.

However, the support portion 97 is not limited to a case of protruding. For example, instead of causing the support portion 97 to protrude, the inner seal member 4, which is a rubber member that has a circular column shape extending in the extension direction L, may be formed longer in the extension direction L, for example.

(4) The above-described embodiment illustrates a case in which the signal terminal 1 is a linear conductive member that transmits signals and power.

However, the signal terminal 1 is not limited to being a conductive member. For example, instead of using the signal terminal 1, which is a conductive member, it is possible to use optical fibers, for example. Also, in the case of including multiple signal terminals 1, signal terminals 1 composed of conductive members and signal terminals 1 composed of optical fibers may be used in combination.

(5) The above-described embodiment illustrates a case in which the electronic substrate is the camera module 110.

However, the electronic substrate is not limited to the camera module 110. For example, the electronic substrate is a vehicle-mounted collision prevention sensor in some cases. Examples of collision prevention sensors include ultrasound sensors and terahertz wave sensors.

(6) The above-described embodiment illustrates a case in which the first engagement hooks 81, which are protrusions that protrude from the inner circumferential surface 8*a* to the inner side R1 in the radial direction R, engage with the first engagement recessed portion 31 and the first shell 3 is locked in the cylindrical space E3 of the connector case 8.

However, instead of the first engagement hooks 81 and the first engagement recessed portion 31 being engaged, the first shell 3 may be locked in the cylindrical space E3 of the connector case 8 through engagement in a mode of performing a screw connection using male screw portions corresponding to the first engagement hooks 81 and female screw portions corresponding to the first engagement recessed portion 31.

The invention claimed is:

1. A receptacle connector comprising:

a signal terminal that can fit together with a plug connector in an extension direction and that is configured to transmit a signal between a plug connector side and an electronic substrate side;

an insulating holder that has a circular column shape extending in the extension direction and that is configured to hold the signal terminal by being penetrated thereby in the extension direction;

a conductive first shell in the form of a tube that covers an outer circumference in a radial direction of the holder;

a non-conductive connector case including a cylindrical space that contains the first shell and extends in the extension direction; and an inner seal member that seals an inner portion of the first shell and an outer seal member that seals an inner portion of the cylindrical space, wherein the inner seal member is an elastic member that has a circular column shape extending in the extension direction, the inner seal member includes an insertion hole into which the signal terminal is press-fit, and the inner seal member seals the inner portion of the first shell in the extension direction in a state in which an outer circumferential portion in the radial direction of the inner seal member is pressed into contact with an inner circumferential surface in the radial direction of the first shell, wherein the outer seal member is a circular ring-shaped elastic member and seals the inner portion of the cylindrical space in the extension direction in a state in which an outer circumferential portion in the radial direction is pressed into contact with an inner circumferential surface of the connector case forming the cylindrical space and an inner circumferential portion in the radial direction is pressed into contact with an outer circumferential surface of the first shell, wherein the connector case includes a first engagement hook that protrudes from the inner circumferential surface of the connector case forming the cylindrical space to an inner side in the radial direction and has an elastic force along the radial direction, on the outer circumferential surface of the first shell, the first shell includes a first engagement recessed portion with which the first engagement hook engages, due to the engagement between the first engagement hook and the first engagement recessed portion, the first shell is restricted from moving with respect to the connector case in the extension direction and is locked to the connector case, a spacer including a surface portion, wherein the surface portion includes a support portion that supports the signal terminal by being penetrated thereby, and a second engagement hook having an elastic force in the radial direction, the second engagement hook protrudes from the surface portion to the plug connector side in the extension direction and is arranged on an outer side in the radial direction of the support portion, on the outer circumferential surface of the first shell, the first shell includes a second engagement recessed portion with which the second engagement hook engages, and the spacer is arranged on the signal terminal in a state in which movement in the extension direction with respect to the connector case is restricted due to the engagement between the second engagement hook and the second engagement recessed portion.

2. The receptacle connector according to claim 1, wherein a surface on the electronic substrate side of the inner seal member is locked by the support portion and is installed at the signal terminal.

3. The receptacle connector according to claim 1, wherein a surface on the plug connector side of the inner seal member is locked by the surface on the electronic substrate side of the holder.

4. The receptacle connector according to claim 2, wherein a surface on the plug connector side of the inner seal member side is locked by the surface on the electronic substrate side of the holder.

5. The receptacle connector according to claim 1, wherein the surface on the plug connector side of the outer seal member is locked by the connector case.

6. The receptacle connector according to claim 2, wherein the surface on the plug connector side of the outer seal member is locked by the connector case.

7. The receptacle connector according to claim 3, wherein the surface on the plug connector side of the outer seal member is locked by the connector case.

8. The receptacle connector according to claim 4, wherein the surface on the plug connector side of the outer seal member is locked by the connector case.

9. The receptacle connector according to claim 1, comprising a conductive second shell having a bottomed tube shape with a bottom portion and a side wall portion, wherein the side wall portion is bent from the periphery of the bottom portion and extends to the electronic substrate side in the extension direction, the bottom portion includes an opening portion through which the first shell penetrates, the opening portion includes a protrusion portion that is bent from an edge portion of the opening portion and extends to the electronic substrate side in the extension direction, and the second shell is arranged on the first shell in a state in which the outer circumferential surface of the first shell and an inner circumferential surface in the radial direction of the protrusion portion are in surface contact.

10. The receptacle connector according to claim 2, comprising a conductive second shell having a bottomed tube shape with a bottom portion and a side wall portion, wherein the side wall portion is bent from the periphery of the bottom portion and extends to the electronic substrate side in the extension direction, the bottom portion includes an opening portion through which the first shell penetrates, the opening portion includes a protrusion portion that is bent from an edge portion of the opening portion and extends to the electronic substrate side in the extension direction, and the second shell is arranged on the first shell in a state in which the outer circumferential surface of the first shell and an inner circumferential surface in the radial direction of the protrusion portion are in surface contact.

11. The receptacle connector according to claim 3, comprising a conductive second shell having a bottomed tube shape with a bottom portion and a side wall portion, wherein the side wall portion is bent from the periphery of the bottom portion and extends to the electronic substrate side in the extension direction, the bottom portion includes an opening portion through which the first shell penetrates, the opening portion includes a protrusion portion that is bent from an edge portion of the opening portion and extends to the electronic substrate side in the extension direction, and the second shell is arranged on the first shell in a state in which the outer circumferential surface of the first shell and an inner circumferential surface in the radial direction of the protrusion portion are in surface contact.

12. The receptacle connector according to claim 4, comprising a conductive second shell having a bottomed tube shape with a bottom portion and a side wall portion, wherein the side wall portion is bent from the periphery of the bottom portion and extends to the electronic substrate side in the extension direction, the bottom portion includes an opening portion through which the first shell penetrates, the opening portion includes a protrusion portion that is bent from an edge portion of the opening portion and extends to the electronic substrate side in the extension direction, and the second shell is arranged on the first shell in a state in which the outer circumferential surface of the first shell and an inner circumferential surface in the radial direction of the protrusion portion are in surface contact.

13. The receptacle connector according to claim 5, comprising a conductive second shell having a bottomed tube shape with a bottom portion and a side wall portion, wherein the side wall portion is bent from the periphery of the bottom portion and extends to the electronic substrate side in the extension direction, the bottom portion includes an opening portion through which the first shell penetrates, the opening portion includes a protrusion portion that is bent from an edge portion of the opening portion and extends to the electronic substrate side in the extension direction, and the second shell is arranged on the first shell in a state in which the outer circumferential surface of the first shell and an inner circumferential surface in the radial direction of the protrusion portion are in surface contact.

14. The receptacle connector according to claim 6, comprising a conductive second shell having a bottomed tube shape with a bottom portion and a side wall portion, wherein the side wall portion is bent front the periphery of the bottom portion and extends to the electronic substrate side in the extension direction, the bottom portion includes an opening portion through which the first shell penetrates, the opening portion includes a protrusion portion that is bent from an edge portion of the opening portion and extends to the electronic substrate side in the extension direction, and the second shell is arranged on the first shell in a state in which the outer circumferential surface of the first shell and an inner circumferential surface in the radial direction of the protrusion portion are in surface contact.

15. The receptacle connector according to claim 7, comprising a conductive second shell having a bottomed tube shape with a bottom portion and a side wall portion, wherein the side wall portion is bent from the periphery of the bottom portion and extends to the electronic substrate side in the extension direction, the bottom portion includes an opening portion through which the first shell penetrates, the opening portion includes a protrusion portion that is bent from an edge portion of the opening portion and extends to the electronic substrate side in the extension direction, and the second shell is arranged on the first shell in a state in which the outer circumferential surface of the first shell and an inner circumferential surface in the radial direction of the protrusion portion are in surface contact.

16. The receptacle connector according to claim 9, wherein the spacer is arranged on the electronic substrate side with respect to the second shell, and the second shell is arranged on the first shell and is locked by the spacer, so as to be restricted from moving in the extension direction with respect to the first shell.

17. The receptacle connector according to claim 16, wherein the outer seal member is arranged on the first shell with its surface on the electronic substrate side locked by the second shell.

18. A connector comprising: the receptacle connector according to claim 1; and the plug connector that is connected to the connector case by being inserted therein from the plug connector side of the receptacle connector, wherein the plug connector includes a connection tube portion that overlaps in a view in a radial direction with the first shell when inserted into the connector case, and at a position at which the first shell and the connection tube portion overlap, the first shell includes a socket-side seal member that seals a gap between the first shell and the connection tube portion.

* * * * *